US007003671B1

(12) United States Patent
Kusakabe et al.

(10) Patent No.: US 7,003,671 B1
(45) Date of Patent: Feb. 21, 2006

(54) INFORMATION PROCESSING DEVICE AND INFORMATION PROCESSING METHOD

(75) Inventors: Susumu Kusakabe, Kanagawa (JP); Masayuki Takada, Tokyo (JP); Masachika Sasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/353,270

(22) Filed: Jul. 14, 1999

(30) Foreign Application Priority Data

Jul. 16, 1998 (JP) ................................. 10-201497

(51) Int. Cl.
*G06F 12/14* (2006.01)

(52) U.S. Cl. ....................... 713/189; 713/172; 713/193
(58) Field of Classification Search ................ 713/200, 713/172, 201, 202, 189, 193; 705/64–65, 705/77, 78, 79, 41; 235/380, 382; 902/26; 725/6; 379/211.05; 340/5.63; 455/407, 455/558; 257/922; 726/1–36; 711/100–173, 711/200–221, 1–6

See application file for complete search history.

(56) References Cited

U.S. PATENT DOCUMENTS

| 4,742,215 A | | 5/1988 | Daughters et al. |
| 5,408,082 A | * | 4/1995 | Takagi et al. ................ 235/492 |
| 5,410,598 A | | 4/1995 | Shear |

(Continued)

FOREIGN PATENT DOCUMENTS

| EP | 0 472 487 | 2/1992 |
| EP | 0 271 495 | 1/1994 |

(Continued)

OTHER PUBLICATIONS

Fuller, Thomas: For Malaysia, Can One 'National Card' Do it All?; International Herald Tribune, Oct. 7, 1997. 3 pages.*

(Continued)

*Primary Examiner*—Hosuk Song
*Assistant Examiner*—Thomas Gyorfi
(74) *Attorney, Agent, or Firm*—Finnegan, Henderson, Farabow, Garrett & Dunner, L.L.P.

(57) ABSTRACT

In a registered card issuing information supply device 131, the registered card issuing information is encrypted, and the encrypted registered card issuing information thus obtained is transmitted through a transmission medium 121 to a registered card issuing machine 101. In the registered card issuing machine 101, the encrypted registered card issuing information from the registered card issuing information supply device 131 is received and registered. When the registered card issuing machine 101 is allowed to communicate with the IC card 2, it transmits the encrypted registered card issuing information thus registered to the IC card 2. In the IC card 2, the encrypted registered card issuing information from the registered card issuing machine 101 is decoded, and the registered card issuing information thus obtained is stored.

12 Claims, 31 Drawing Sheets

DIRECTORY STRUCTURE

U.S. PATENT DOCUMENTS

| | | | |
|---|---|---|---|
| 5,715,431 A * | 2/1998 | Everett et al. | 711/156 |
| 5,988,510 A * | 11/1999 | Tuttle et al. | 235/492 |
| 6,068,192 A * | 5/2000 | McCabe et al. | 235/487 |
| 6,253,322 B1 * | 6/2001 | Susaki et al. | 713/170 |
| 6,289,102 B1 * | 9/2001 | Ueda et al. | 380/201 |
| 6,915,375 B1 * | 7/2005 | Suzuki | 711/103 |

FOREIGN PATENT DOCUMENTS

| | | |
|---|---|---|
| EP | 0 583 006 | 2/1994 |
| EP | 0 790 551 | 8/1997 |
| EP | 0 818 761 | 1/1998 |
| EP | 0 825 739 | 2/1998 |
| EP | 0 847 031 | 6/1998 |
| WO | WO 97 29416 | 8/1997 |

OTHER PUBLICATIONS

W. Rankl Und W. Effing, "Handbuch der Chipkarten", C. Hanser Verlag, DE, AT; XP 002176035; 1995, ISBN 3-446-17993-3, pp. 88-105, 149-159, 168-171, 182-189.

Rankl and Effing: "Handbuch der Chipkarten" 1995, Carl Hanser Verlag, Germany XP002176034.

Rankl and Effing: "Handbuch der Chipkarten", Carl Hanser Verlag, Germany XP002176035.

* cited by examiner

DIRECTORY STRUCTURE

INFORMATION PROCESSING DEVICE AND INFORMATION PROCESSING METHOD

BACKGROUND OF THE INVENTION

1. Field of the Invention

The present invention relates to an information processing device and an information processing method, and to an information processing device and an information processing method which can safely add and change management information to manage a memory contained in an IC (Integrated Circuit) card, for example without withdrawing the IC card.

2. Description of the Related Art

For example, an IC card (smart card) which is expected to be used in an electronic money system, a security system, etc. has been developed. The IC card has a CPU for performing various processing and a memory for storing data necessary for the processing, and data transmission/reception to/from the IC card is performed while it is electrically connected to a predetermined reader/writer (R/W) or under a non-contact state by using electromagnetic wave. An IC card which performs data transmission/reception with R/W under non-contact state by using electromagnetic wave is generally supplied with necessary power through electromagnetic wave.

In a case where the IC card is used in the electronic money system, the security system or the like, secrecy of data and security such as prevention of forgery, etc. are important. In general, an access to an IC card is allowed by a key given from the manager (operator) of a system. That is, restriction is imposed on an access to an IC card by a person having no key.

Further, the security is defined in ISO (International Organization For Standardization) 7816 which defines the standardization of contact type IC cards, and according to it, by locking DF (Dedicated File) corresponding to a director or folder, an access to DF belonging to the layer of the DF or EF (Elementary File) corresponding to a file is restricted.

In general, IC cards which have been issued to users and thus distributed in the market are withdrawn by managers or makers of the IC cards, and a so-called card issuing work of newly adding each IC card with a file in which data for supplying new services are held or changing a key necessary for data access is generally carried out by them in facilities or the like for which the security is highly managed.

That is, in general, an issuer of IC cards performs a primary issuing work as shown in FIG. 1 and issues IC cards having no function (IC cards for which data read/write operation cannot be performed) to a registered card issuing dealer who performs a registered card issuing work. The registered card issuing dealer performs the registered card issuing work (secondary issuing work) so that a manager #1 who wishes to issues services through the IC cards can use the IC cards. That is, the registered card issuing dealer keeps in each IC card a storage area to be used by the manager #1 (the area of the manager #1), and writes a key necessary to access the storage area and other information in each IC card. Here, the registered card issuing work is carried out at a place for which the security is highly managed, such as facilities of the registered card issuing dealer or the like (hereinafter referred to as "proper and safe place"). Further, in FIG. 1, the registered card issuing dealer and the manager #1 are frequently the same person.

The IC cards which have been subjected to the registered card issuing work are put on the market and distributed to users. The IC cards are used to supply services by the manager #1. That is, users can use the IC cards as electronic passes or purses.

When the IC cards which are put on the market as described above are multifunctional IC cards and a manager #2 other than the manager #1 wishes to supply a service through the multifunctional IC cards, the registered card issuing dealer temporarily withdraws the IC cards which have been put on the market as shown in FIG. 2. The registered card issuing dealer performs the registered card issuing work so that the manager #2 can use the IC cards. That is, the registered card issuing dealer keeps a storage area to be used by the manager #2 (the area of the manager #2) in each IC card and further writes in each IC card a key which is necessary for the manager #2 to access the storage area, and other information. Thereafter, the IC cards which have been subjected to the registered card issuing work are put on the market again.

For example, a key written in an IC card through the registered card issuing work is information which is important in security of the IC card, and it is undesirable that such information is distributed to places such as the market, etc. in which unjust actions such as tapping, tampering, etc. are carried out with high probability and for which the security management is not carried out (hereinafter referred to as "improper and unsafe places"). Therefore, the IC cards are withdrawn from the market and the registered card issuing work is carried out at a safe place as described above.

Accordingly, the IC cards must be withdrawn every time the registered card issuing work is wished to be carried out, and this is cumbersome.

SUMMARY OF THE INVENTION

The present invention has been implemented in view of such a situation, and has an object to enable a key necessary for access to a storage area and other information to be safely written even at places which are not safe on security.

In order to attain the above object, according to an aspect of the present invention, there is provided an information processing device which is characterized by comprising an encrypting means for encrypting management information containing a key necessary to access a storage area of data storage means in order to manage the storage area of the data storage means. The encrypting means encrypts the management information containing the key necessary to access the storage area in order to manage the storage area of the data storage means.

According to another aspect of the present invention, there is provided an information processing method which is characterized by comprising an encrypting step of encrypting management information containing a key necessary to access a storage area of data storage means in order to manage the storage area of the data storage means. The management information containing the key necessary to access the storage area in order to manage the storage area of the data storage means is encrypted.

According to a further aspect of the present invention, there is provided an information processing device which is characterized by comprising a decoding means for decoding encrypted management information which contains a key necessary to access a storage area of data storage means in order to manage the storage area of the data storage means. The decoding means decodes the encrypted management information which contains the key necessary to access the storage area in order to manage the storage area of the data storage means.

According to a still further aspect of the present invention, there is provided an information processing method which is characterized by comprising a decoding step of decoding encrypted management information which contains a key necessary to access a storage area of data storage means in order to manage the storage area of the data storage means. The encrypted management information which contains the key necessary to access the storage area in order to manage the storage area of the data storage means is decoded.

DETAILED DESCRIPTION OF THE PREFERRED EMBODIMENTS

Preferred embodiments according to the present invention will be described hereunder with reference to the accompanying drawings. Before the description of the embodiments, the feature of the present invention will be hereunder described by adding a corresponding embodiment (however, an example) into parentheses after each means in order to clarify the corresponding relationship between the respective means of the present invention described in "Scope of claim for Patent" and the following embodiments.

Figure 30:
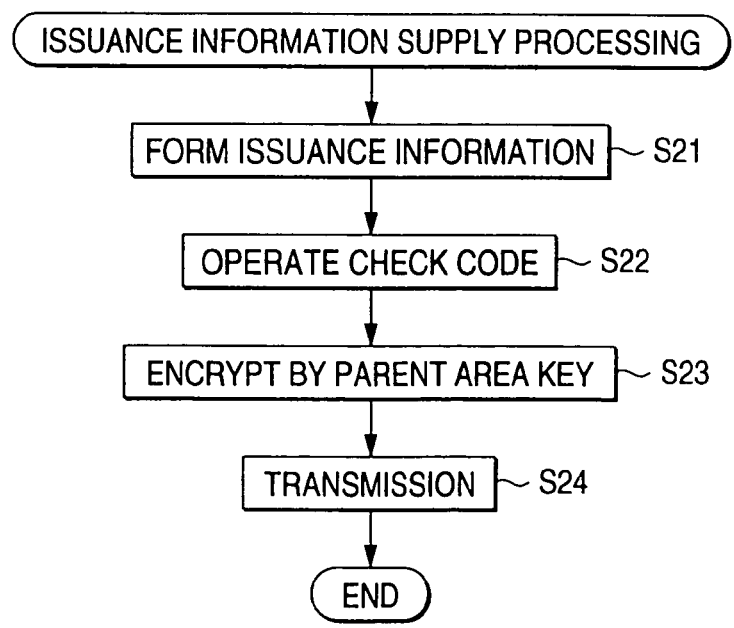
FIG. 30 is a flowchart showing the registered card issuing information supply processing.

That is, the information processing device of the first aspect of the present invention is an information processing device for performing processing to supply management information to a data storage device which contains data storage means for storing data (for example, EEPROM 66 shown in FIG. 5 or the like), management information storage means for storing management information containing a key necessary to access a storage area of data storage means in order to manage the storage area of the data storage means (for example, EEPROM 66 shown in FIG. 5 or the like) and management means for managing the data storage means (for example, a sequencer 91 shown in FIG. 5 or the like), and it is provided with forming means for forming the management information (for example, a processing step S21 of a program shown in FIG. 30 or the like), and encrypting means for encrypting the management information (for example, a processing step S23 of a program shown in FIG. 30 or the like).

The above information processing device further includes operating means for operating a check code to check whether the management information is tampered or not (for example, a processing step S22 of the program shown in FIG. 30 or the like), and the encrypting means encrypts the check code as well as the management information.

The above information processing device further includes transmission means for transmitting the encrypted management information to a data storage device through a predetermined transmission medium (for example, a processing step S24 of the program shown in FIG. 30 or the like).

Figure 9:
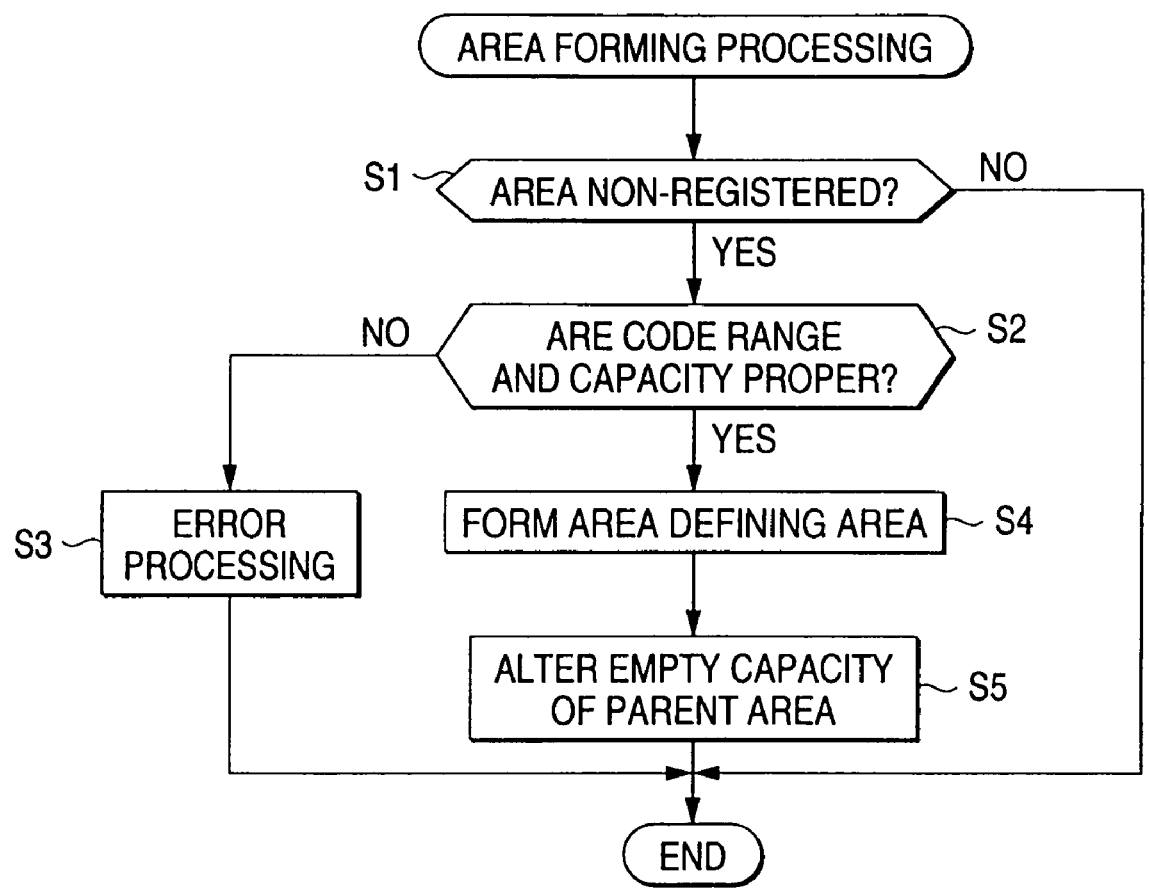
FIG. 9 is a flowchart showing area forming processing.
Figure 10:
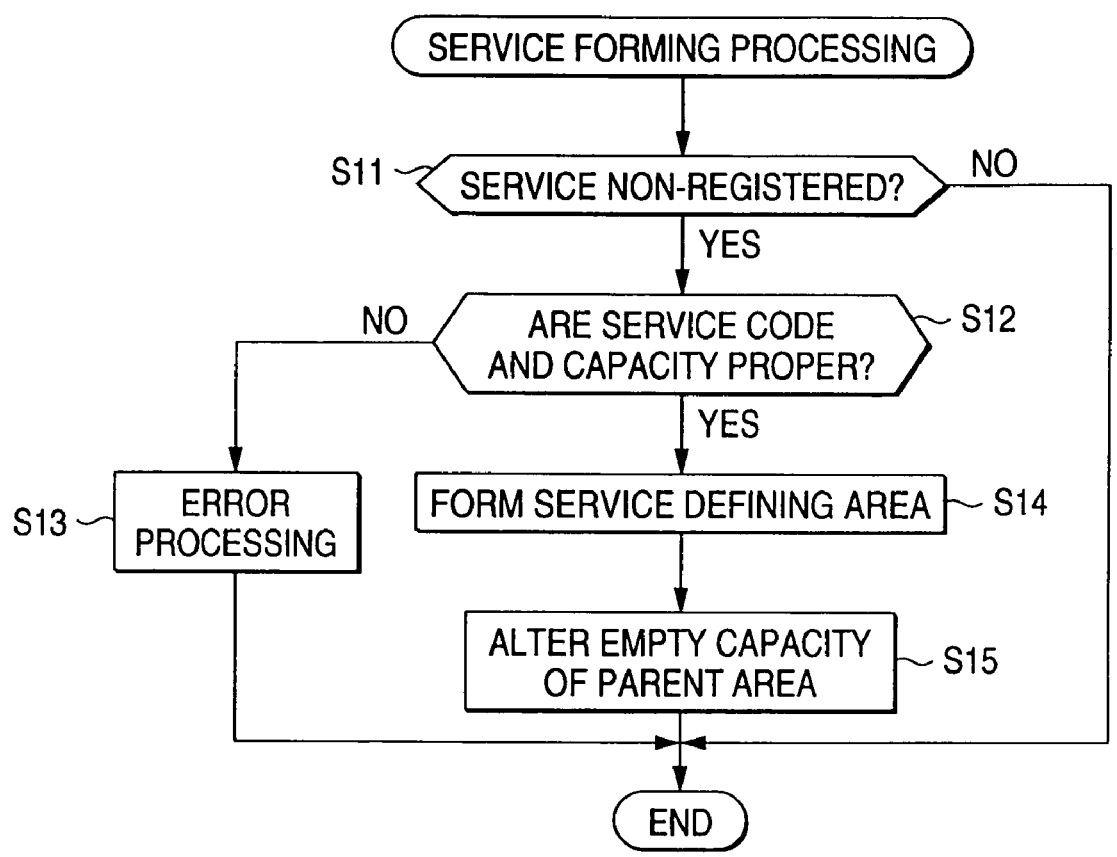
FIG. 10 is a flowchart showing service forming processing.

The information processing device of the third aspect of the present invention is an information processing device having data storage means for storing data (for example, EEPROM 66 shown in FIG. 5 or the like), management information storage means for storing management information containing a key necessary to access a storage area of data storage means in order to manage the storage area of the data storage means (for example, EEPROM 66 shown in FIG. 5 or the like) and management means for managing the data storage means (for example, a sequencer 91 shown in FIG. 5 or the like), and it includes reception means for receiving the encrypted management information (for example, an interface unit 61 shown in FIG. 5 or the like), decoding means for decoding the encrypted management information (for example, a processing step S32 of a program shown in FIG. 32), and storage control means for storing the management information into management information storage means (for example, a processing step S4 of a program shown in FIG. 9, a processing step S14 of a program shown in FIG. 10 or the like).

Figure 32:
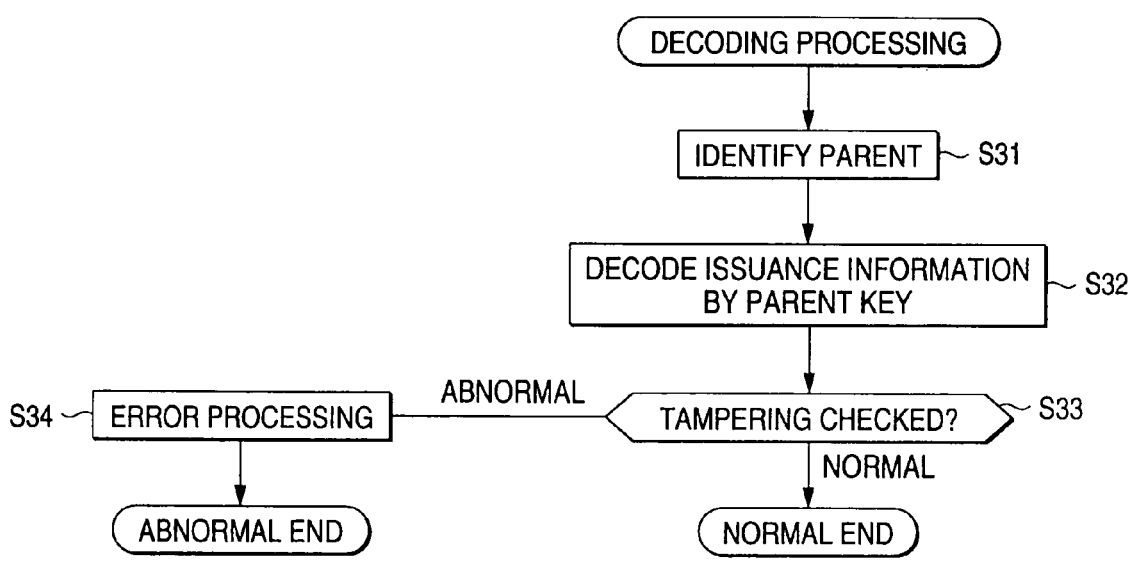
FIG. 32 is a flowchart showing decoding processing.

The information processing device further includes check means for checking whether the management information is tampered or not (for example, a processing step S33 of the program shown in FIG. 32 or the like).

It is needless to say that the above description does not mean that the respective means is limited to the foregoing ones.

Figure 1:
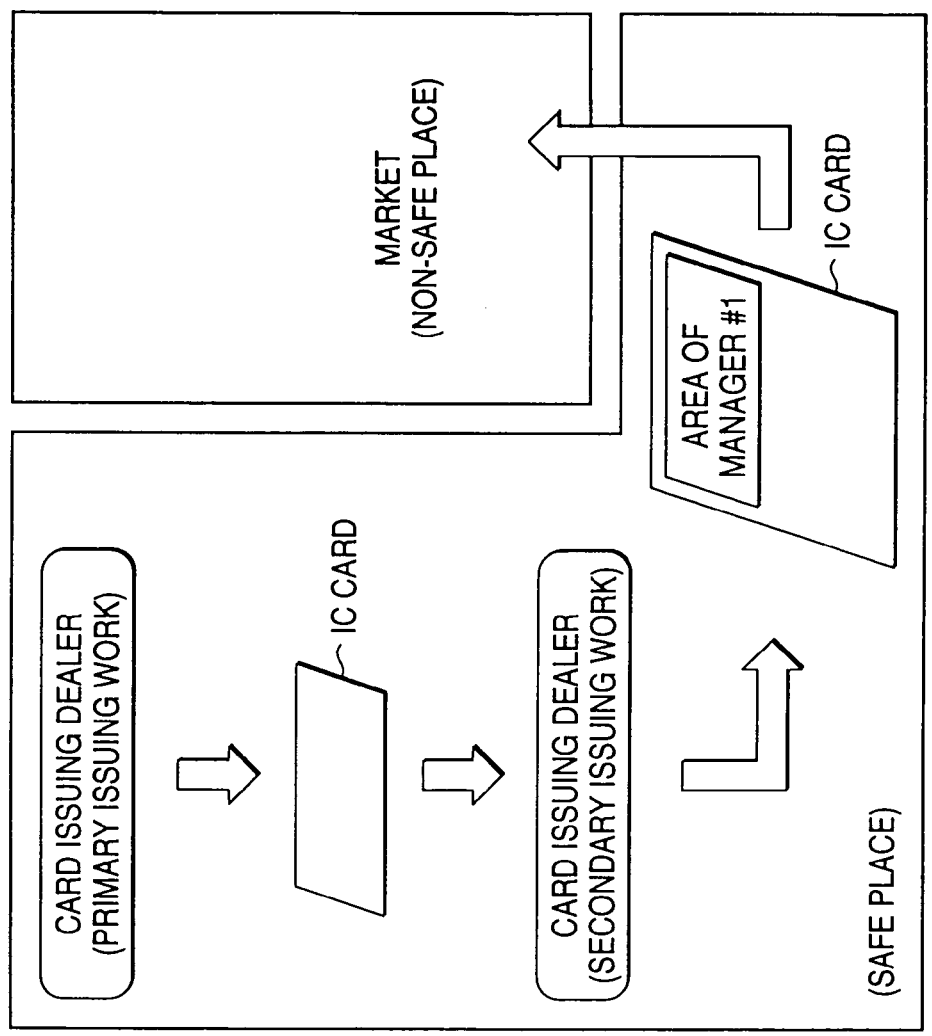
FIG. 1 is a diagram showing the distribution of conventional IC cards.
Figure 2:
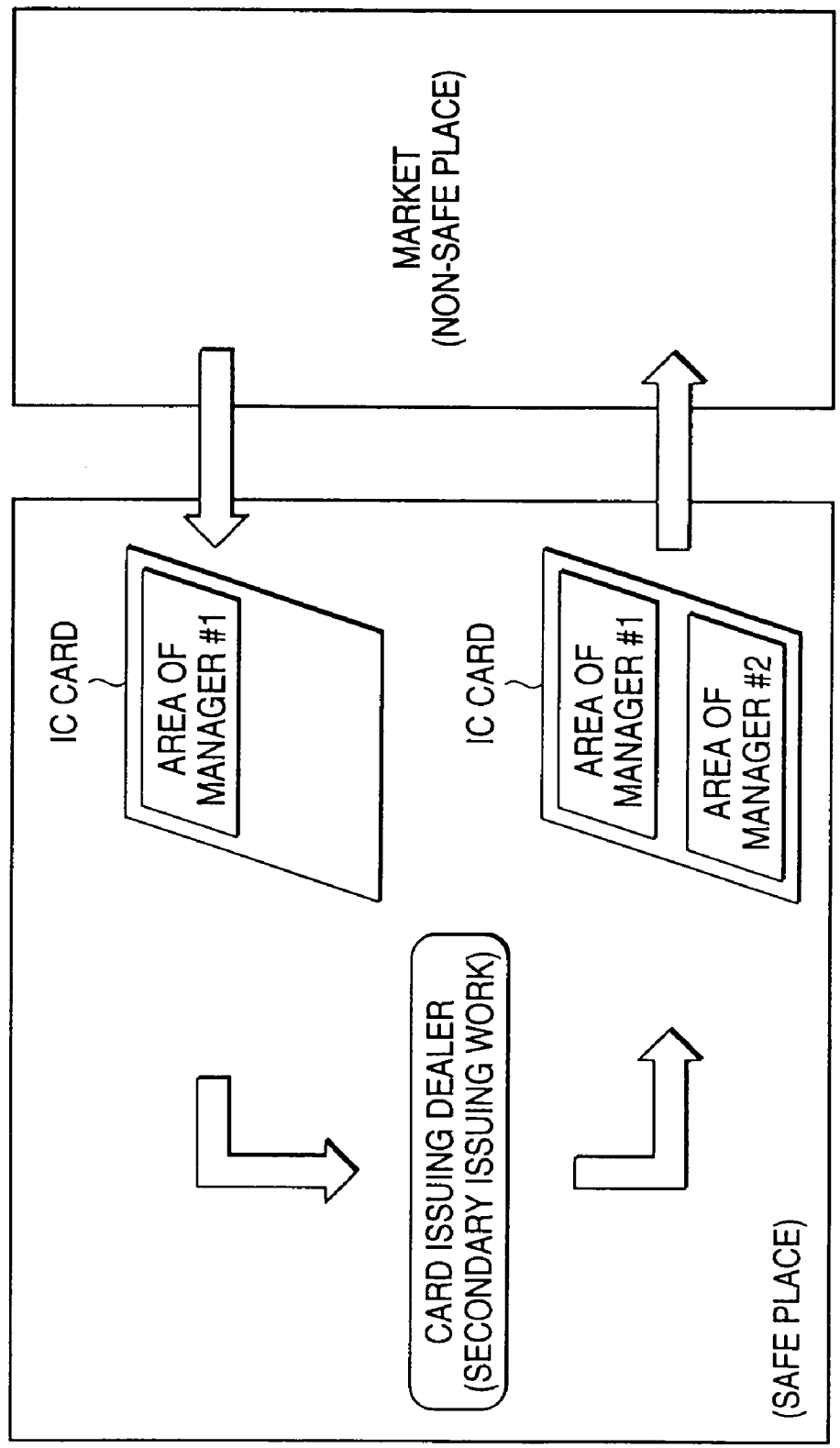
FIG. 2 is a diagram showing the distribution of conventional IC cards.
Figure 3:
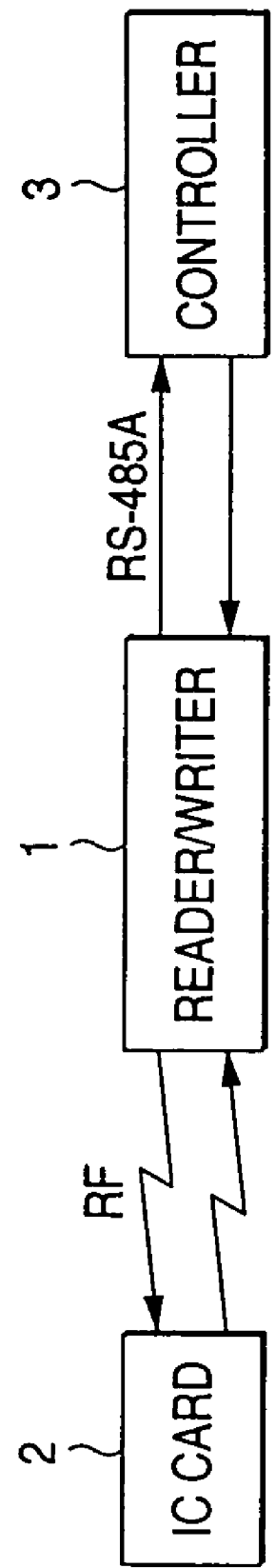
FIG. 3 is a block diagram showing the construction of an embodiment of a card system using an IC card to which the present invention is applied.

FIG. 3 shows the construction of an embodiment of a non-contact card system using an IC card to which the present invention is applied (the system means a logical assembly of plural devices, and it is not dependent on whether the respective devices are located in the same housing or not).

The non-contact card system comprises R/W 1, an IC card 2 and a controller 3, and data transmission/reception is carried out between the R/W1 and the IC card 2 under non-contact state by using electromagnetic wave.

That is, R/W 1 transmits a predetermined command to the IC card 2, and the IC card 2 receives the command to perform the processing corresponding to the command. The IC card 2 transmits the response data corresponding to the processing result to R/W 1.

R/W 1 is connected to the controller 3 through a predetermined interface (which is conformed with the standard of RS-485A or the like), and the controller 3 supplies a predetermined control signal to R/W 1 so that R/W 1 performs predetermined processing.

Figure 4:
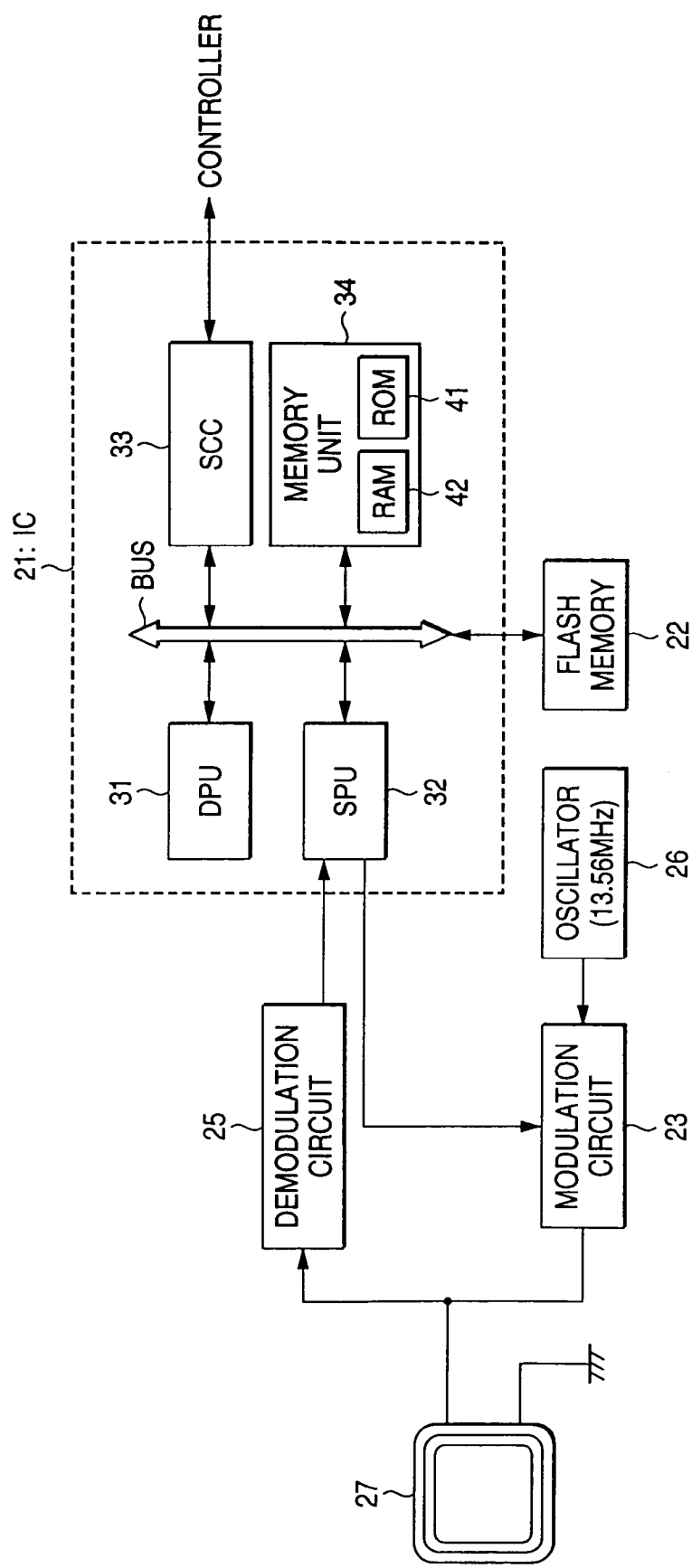
FIG. 4 is a block diagram showing the construction of a reader/writer 1 of FIG. 3.

FIG. 4 shows the construction of R/W 1 of FIG. 3.

In IC 21, DPU (Data Processing Unit) 31 for performing data processing, SPU (Signal Processing Unit) 32 for processing data to be transmitted to the IC card 2 and data received from the IC card 2, SCC (Serial communication Controller) 33 which communicates with the controller 3, and a memory unit 34 comprising a ROM portion 41 for beforehand storing information required to process data and a RAM portion 42 for temporarily storing data during processing are connected to one another through a bus.

Further, a flash memory 22 for storing predetermined data is also connected to the bus.

DPU 31 outputs to SPU 32 a command to be transmitted to the IC card 2, and receives from SPU 32 response data received from the IC card 2.

After predetermined processing (for example, BPSK (Bi-Phase Shift Keying) modulation (coding to Manchester code) or the like) is carried out on the command to be transmitted to the IC card 2, SPU 32 outputs it to a modulation circuit 23, and also it receives from a demodulation circuit 25 the response data transmitted by the IC card 2 to perform predetermined processing on the data.

The modulation circuit 23 performs ASK(Amplitude Shift Keying) modulation on carrier wave having a predetermined frequency (for example, 13.56 MHz) supplied from an oscillator (OSC) 26 on the basis of data supplied from SPU 32, and outputs the modulation wave thus generated as electromagnetic wave through an antenna 27 to the IC card 2. At this time, the modulation circuit 23 is designed so that the modulation factor is set to be less than 1 and the ASK modulation is performed, whereby the maximum amplitude of the modulation wave is prevented from being reduced to zero even at low level of the data.

The demodulation circuit 25 demodulates the modulation wave (ASK-modulated wave) received through the antenna 27, and outputs the data thus demodulated to SPU 32.

Figure 5:
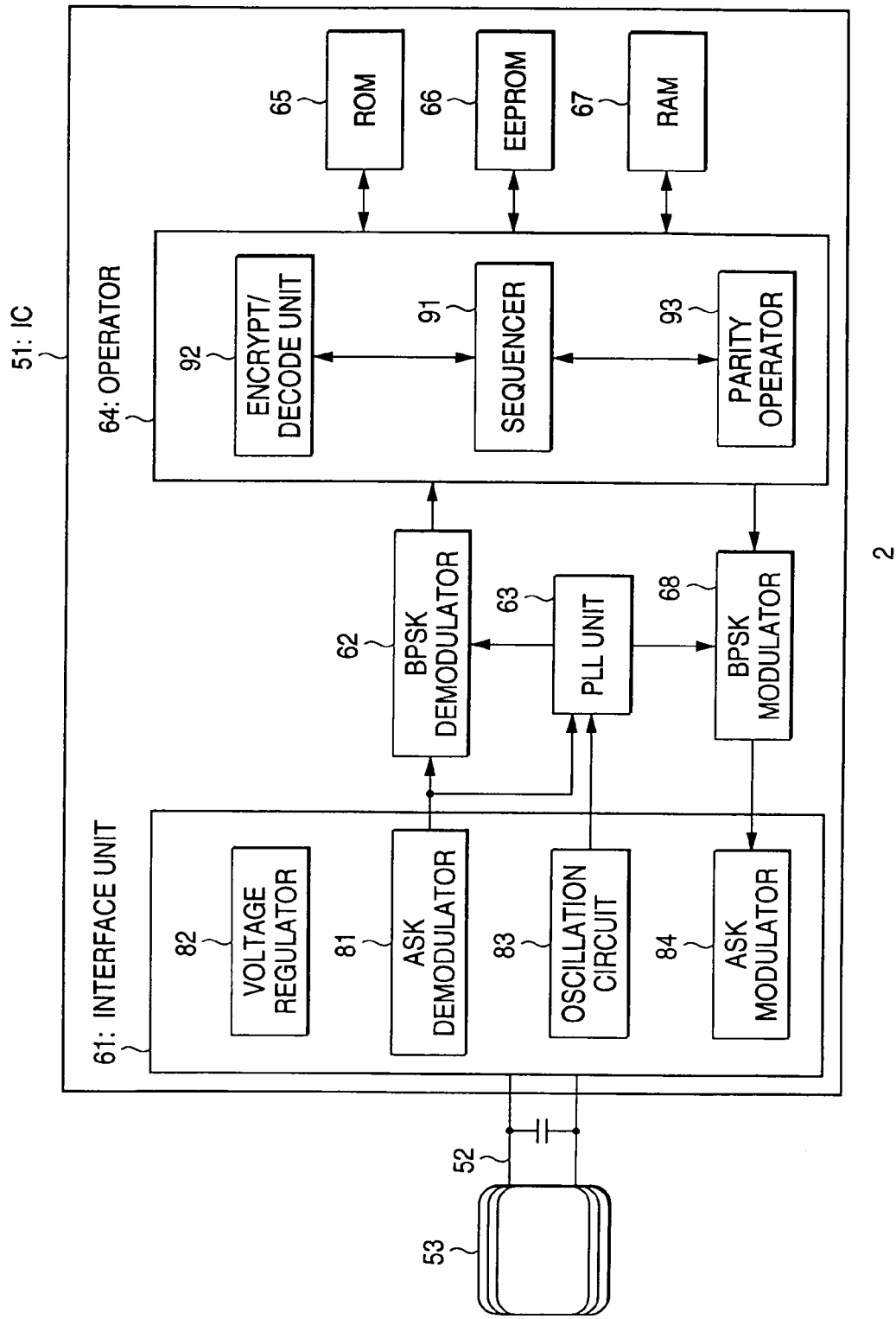
FIG. 5 is a block diagram showing the construction of the IC card 2 of FIG. 3.

FIG. 5 shows the construction of the IC card 2 of FIG. 3.

In the IC card 2, IC 51 receives the modulation wave transmitted from R/W 1 through the antenna 53. A capacitor 52 constitutes an LC circuit together with the antenna 53, and it is designed so as to be tuned (oscillated) with electromagnetic wave having a predetermined frequency (carrier frequency).

In IC 51, an RF interface unit 61 detects and demodulates the modulation wave (ASK-modulated wave) received through the antenna 53 by an ASK demodulator 81, and outputs the data thus demodulated to a BPSK demodulation circuit 62 and a PLL (Phase Locked Loop) unit 63. In addition, it stabilizes the signal detected in an ASK demodulator 81 by a voltage regulator 82, and supplies it as a DC power to each circuit.

The RF interface unit 61 oscillates a signal having the same frequency as the clock frequency of the data in an oscillation circuit 83, and outputs the signal to the PLL unit 63.

In the RF interface unit 61, the load of the antenna 53 serving as the power source of the IC card 2 is varied in connection with data supplied through the BPSK modulation circuit 68 from the operation unit 64 in the ASK modulator 81 (for example, a prescribed switching element is switched on/off in connection with data and only when the switching element is switched on, a predetermined load is connected to the antenna 53 in parallel), whereby the modulation wave received through the antenna 53 is subjected to ASK modulation (when the data are transmitted from the IC card 2 (the IC card 2 is made to transmit data), R/W 1 sets the maximum amplitude of the modulation wave output therefrom to a fixed value, and this modulation wave is subjected to the ASK modulation on the basis of the variation of the load of the antenna 53), and transmits the modulation component thereof through the antenna 53 to R/W 1 (varies the terminal voltage of the antenna 27 of R/W 1).

On the basis of the data supplied from the ASK demodulator 81, the PLL unit 63 generates a clock signal which is in synchronism with the data, and outputs the clock signal to the BPSK demodulation circuit 62 and the BPSK modulation circuit 68.

When the data demodulated in the ASK demodulator 81 are BPSK-modulated, the BPSK demodulation circuit 62 demodulates the data (decodes Manchester code) according to the clock signal supplied from the PLL unit 63 and outputs the data thus demodulated to the operation unit 64.

When the data supplied from the BPSK demodulation circuit 62 are encrypted, the operation unit 64 decodes the data in an encrypt/decode unit 92, and then processes the data in a sequencer 91. When the data are not encrypted, the data supplied from the BPSK demodulation circuit 62 are directly supplied to the sequencer 91, not passing through the encrypt/decode unit 92.

The sequencer 91 is designed to perform the processing corresponding to data as a command to be supplied thereto. That is, for example, the sequencer 91 performs data writing and reading operation into/from EEPROM 66 and other necessary operation processing. Further, the sequencer 91 performs an access control to EEPROM 66 on the basis of certification and also manages EEPROM 66.

A parity operator 93 of the operation unit 64 calculates a Reed Solomon code as a parity on the basis of the data stored in EEPROM 66.

After the operation unit 64 performs predetermined processing in the sequencer 91, it outputs the response data corresponding to the processing (the data to be transmitted to R/W 1) to the BPSK modulation circuit 68.

The BPSK modulation circuit 68 subjects the data supplied from the operation unit 64 to BPSK modulation, and outputs the data thus modulated to the ASK modulator 84 of the RF interface unit 61.

ROM (Read Only Memory) 65 stores a program with which the sequencer 91 performs its processing, and other necessary data. RAM 67 temporarily stores data in the course of the processing of the sequencer 91.

EEPROM (Electrically Erasable and Programmable ROM) 66 is a non-volatile memory, and it continues to store data even when the IC card 2 finishes the communication with R/W 1 and power supply is stopped.

Next, the data transmission/reception processing between R/W 1 and the IC card 2 will be described.

R/W1 (FIG. 4) radiates predetermined electromagnetic wave from the antenna 27, monitors the load state of the antenna 27 and waits until the variation of the load state due to approach of the IC card 2 is detected. R/W 1 may perform processing (polling) in which the electromagnetic wave which is ASK-modulated on the basis of data of a predetermined short pattern is radiated to call to the IC card 2 until a response is obtained from the IC card 2 within a fixed time.

When the approach of the IC card 2 is detected in R/W 1, SPU 32 of R/W 1 subjects rectangular wave of a predetermined frequency (for example, a frequency which is twice as high as the clock frequency of the data) as carrier wave, performs it to BPSK modulation on the basis of data to be transmitted to the IC card 2 (the command corresponding to processing to be executed by the IC card 2, write-in data to be written into the IC card 2, etc.), and outputs the modulation wave (BPSK modulation signal) thus generated (Manchester code) to the modulation circuit 23.

In the BPSK modulation processing, the data can be associated with the variation of the phase of the modulation wave by using differential conversion, and in this case, the BPSK modulation signal can be demodulated to the original data even when it is inverted. Therefore, it is unnecessary to consider the polarity of the modulation wave in the demodulation operation.

On the basis of the BPSK modulation signal input, the modulation circuit 23 subjects predetermined carrier wave to the ASK modulation at a modulation factor (=maximum amplitude of data signal/maximum amplitude of carrier wave) which is less than 1 (for example,. 0.1), and transmits the modulation wave (ASK modulation wave) thus generated through the antenna 27 to the IC card 2.

When no transmission is carried out, the modulation circuit 23 generates the modulation wave, for example, at high level of two levels (high level and low level) of digital signals.

In the IC card 2 (FIG. 5), a part of electromagnetic wave radiated from the antenna 27 of R/W 1 is converted to an electrical signal in an LC circuit comprising an antenna 53 and a capacitor 52, and the electrical signal (modulation wave) is output to the RF interface 61 of IC 51. The ASK demodulator 81 of the RF interface 61 detects an envelope by rectifying and smoothening the modulation wave and supplies the signal thus generated to the voltage regulator 82. In addition, it suppresses the DC component of the signal to extract the data signal, and outputs the data signal to the BPSK demodulation circuit 62 and the PLL unit 63.

At this time, the terminal voltage $V_0$ of the antenna 53 is as follows.

$$V_0 = V_{10}(1 + k \times Vs(t)) \cos(\omega t)$$

However, $V_{10}\cos(\omega t)$ represents carrier wave, k represents the modulation factor and Vs (t) represents data output from SPU 32.

The value $V_{LR}$ of low level in the voltage $V_1$ after the rectification by the ASK demodulator 81 is as follows.

$$V_{LR} = V_{10}(1 + k \times (-1)) - Vf$$

Here, in the ASK demodulator 81, Vf represents a voltage drop in a diode (not shown) constituting a rectifying circuit for rectification and smoothening, and it is generally equal to about 0.7 volt.

When receiving the signal rectified and smoothened by the ASK demodulator 81, the voltage regulator 82 stabilizes the signal and supplies it as DC power to respective circuits as well as the operation unit 64. In this case, since the modulation factor k of the modulation wave is less than 1 as described above, the voltage variation (the difference between the high level and the low level) after the rectification is small. Accordingly, the DC power can be easily generated in the voltage regulator 82.

Here, when the modulation wave having the modulation factor k of 5% is received so that $V_{10}$ is above 3 volts, the low level voltage $V_{LR}$ after the rectification is equal to 2.15 (=3×(1−0.05)−0.7) volts or more, and the voltage regulator 82 can supply a sufficient voltage as power to each circuit. In this case, the amplitude $2 \times k \times V_{10}$ (Peak-to-Peak value) of the AC component (data component) of the voltage $V_1$ after the rectification is equal to 0.3 (=2×0.05×3) volts or more, and the ASK demodulator 81 can demodulate the data at a sufficiently high S/N ratio.

As described above, by using the ASK modulation wave having a modulation factor k less than 1, a communication having a low error rate (in a high S/N ratio state) can be performed, and a DC voltage which is sufficient as power can be supplied to the IC card 2.

When receiving the data signal (BPSK demodulation signal) from the ASK demodulator 81, the BPSK demodulation circuit 62 demodulates the data signal according to the clock signal supplied from the PLL unit 63 and outputs the data thus demodulated to the operation unit 64.

When the data supplied from the BPSK demodulation circuit 62 are encrypted, the operation unit 64 decodes the data in the encrypt/decode unit 92, and then supplies the data (command) to the sequencer 91 to process the data. During this time period, that is, during the period from the time when the data are transmitted to the IC card 2 until a response to the transmission is received, R/W 1 transmits data having a value of 1 and is on standby. Accordingly, during this time, the IC card 2 receives the modulation wave whose maximum amplitude is constant.

After the processing is finished, the sequencer 91 outputs the data on the processing result, etc. (data to be transmitted to R/W 1) to the BPSK modulation circuit 68. The BPSK modulation circuit 68 subjects the data to the BPSK modulation (coding to Manchester code) as in the case of SPU 32 of R/W 1, and then outputs the modulated data to the ASK modulator 84 of the RF interface unit 61.

The ASK modulator 84 varies a load connected to both the ends of the antenna 53 in accordance with data from the BPSK modulation circuit 68 by using a switching element or the like, whereby the modulation wave received (the maximum amplitude of the modulation wave output from R/W 1 is constant at the transmission time of data from the IC card 2 as described above) is subjected to ASK modulation in accordance with the data to be transmitted to vary the terminal voltage of the antenna 27 of R/W1, and then transmits the data thus modulated to R/W 1.

The modulation circuit 23 of R/W 1 continues the transmission of data having value of 1 (high level) at the reception time of the data from the IC card 2. In the demodulation circuit 25, the data transmitted from the IC card 2 is detected on the basis of minute variation (for example, several tens micro volts) of the terminal voltage of the antenna 27 which is electromagnetically coupled to the antenna 53 of the IC card 2.

Further, in the demodulation circuit 25, the detected signal (ASK modulation wave) is amplified and modulated by a high-gain amplifier (not shown), and digital data thus obtained are output to SPU 32. SPU 32 demodulates the data (BPSK modulation signal) and outputs it to DPU 31. DPU 31 processes data from SPU 32 and judges on the basis of the processing result whether the communication should be finished or not. If it judges that the communication is carried out again, the communication between R/W 1 and the IC card 2 is carried out like the above case. On the other hand, if it judges that the communication is finished, R/W 1 finishes the communication processing with the IC card 2.

As described above, R/W 1 transmits data to the IC card 2 by using the ASK modulation in which the modulation factor k is less than 1, and the IC card 2 receives the data to carry out the processing corresponding to the data and returns the data corresponding to the processing result to R/W 1.

Figure 6:
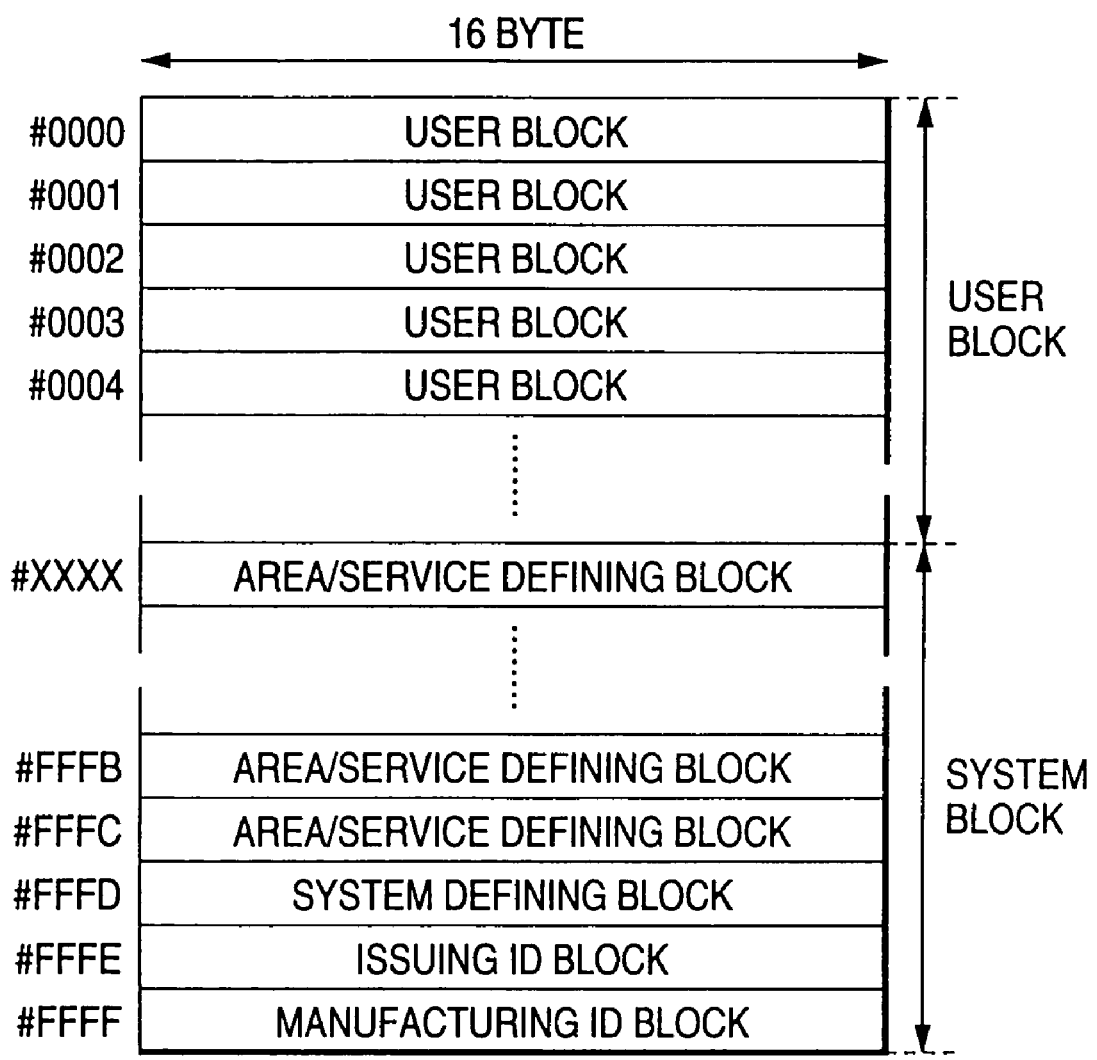
FIG. 6 is a diagram showing a logical format of EEPROM 66 of FIG. 5.

FIG. 6 shows a logical format of EEPROM 66 of FIG. 5.

EEPROM 66 is constructed on a block basis, and in an embodiment of FIG. 6, one block is composed of 16 bytes, for example.

Further, in the embodiment of FIG. 6, the logical address of the uppermost block is set to #0000h (h represents a hexadecimal number), and other logical addresses are allocated in ascending numeric order. In FIG. 6, #0000h to #FFFFh are allocated as the logical addresses, and thus blocks of 65536 (=$2^{16}$) are constructed.

The blocks are constructed as so to be used as a user block or system block. The blocks of EEPROM 66 are allocated to the user blocks in the ascending numeric order of the logical addresses, and allocated to the system blocks in the descending numeric order of the logical addresses. That is, in FIG. 6, the user blocks are increased downwardly and the system blocks are increased upwardly. At the time when there is no empty block, the user block and the system block cannot be formed. Accordingly, the boundary between the user blocks and the system blocks is not fixed, and no restriction is imposed on the number of the user blocks and the number of the system blocks (however, in the embodiment of FIG. 6, the total number of the user blocks and the system blocks is limited to 65536 or less).

The system blocks are classified into five kinds of a manufacturing ID (Identification) block, an issuance ID block, a system defining block, an area defining block and a service defining block. In the embodiment of FIG. 6, the block serving as the area defining block or service defining block is shown as an area/service defining block.

Out of the system blocks, the three kinds of blocks of the manufacturing ID block, the issuance ID block and the system defining block have been basically disposed at the issuance time of the IC card 2, and they are disposed at logical addresses #FFFFh, #FFFEh and #FFFDh, respectively. The area/service defining blocks are disposed in forming order at logical addresses higher than the logical address #FFFCh.

Information on the manufacturing of the IC card 2 is disposed in the manufacturing ID block. That is, for example, a unique manufacturing ID, a manufacturing date, a manufacture code, etc. are disposed in the manufacturing ID block.

Information on issuance of the IC card 2 is disposed in the issuance ID block. That is, in the issuance ID block are disposed codes of an issuance date of the IC card 2, an issuance order of the IC card 2, etc.

In the system defining block are disposed the number of system blocks or user blocks owned by EEPROM 66, a system key and the like. The system key is used when mutual certification is carried out among the IC card 2, R/W 1 and the controller 3.

The area defining block is formed by allocating a storage area (area) of EEPROM 66 to the manager, and information to manage the storage area allocated to the manager itself, etc. are disposed in the area defining block. That is, in the area defining block are disposed a code range described later, an empty capacity, an area key, etc., for example.

In the service defining block are disposed information to manage a service area described later (the capacity of a service area, a service key, etc.), etc.

Next, the storage area of EEPROM 66 is managed in the sequencer 91 with being layered.

Figure 7:
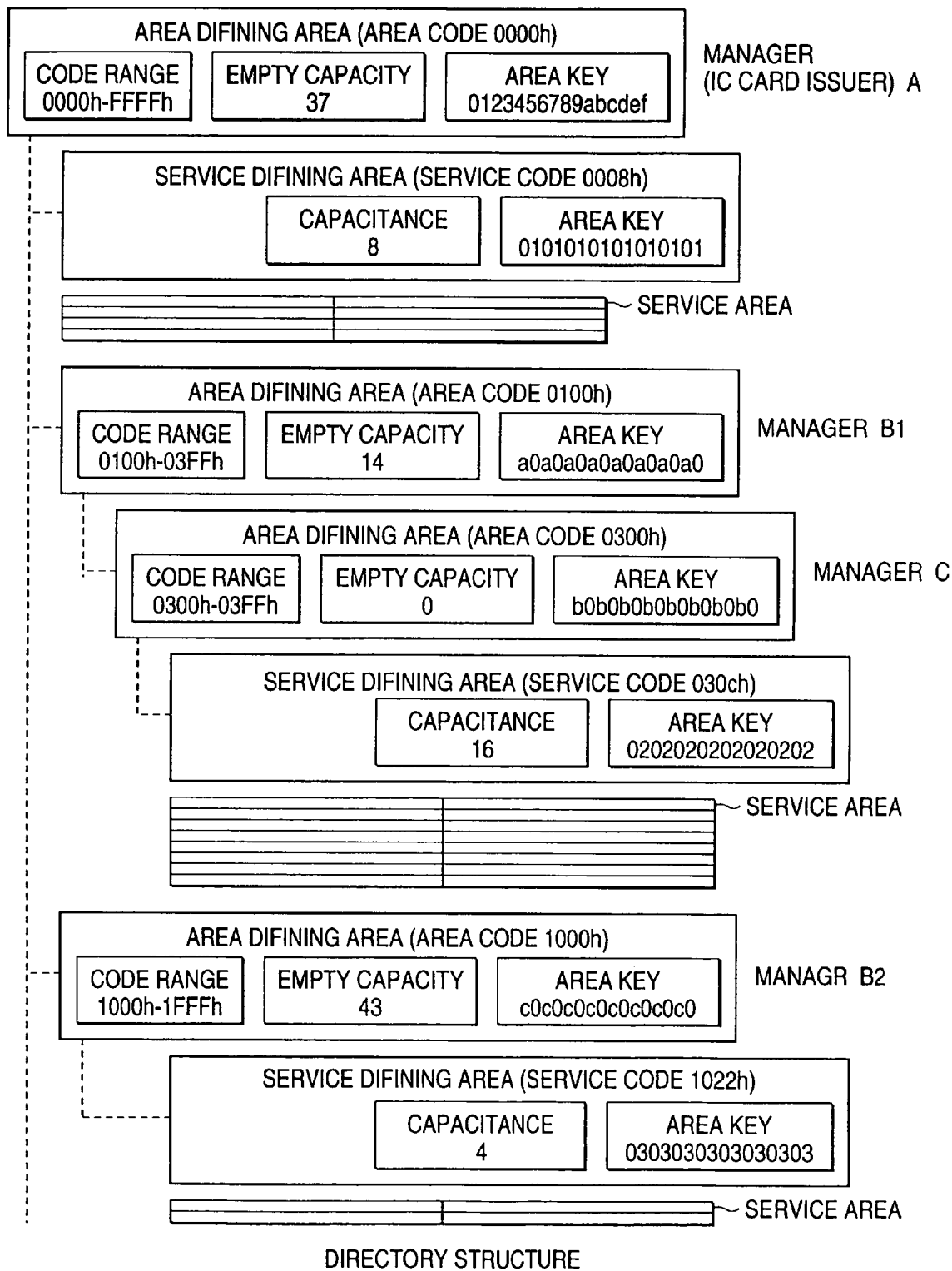
FIG. 7 is a diagram showing the directory structure of EEPROM 66 of FIG. 5.

That is, FIG. 7 shows the directory structure of EEPROM 66.

The storage area of EEPROM 66 is designed in a layered structure in which the area defining area is layered, and the area defining area is designed so as to be able to have an area defining area and a service defining area.

The area defining area is allocated to the manager. In the area defining area are disposed a code range representing a range of identification codes which are usable as names for identification of the area defining area and the service defining area by the manager, an empty capacity representing the number of empty blocks available, an area key to generate an access key described later which is used for certification and the like. Here, the area defining area of 1 corresponds to the area defining block of 1 described with respect to FIG. 6.

In the embodiment of FIG. 7, the area defining area allocated to the manager A constitutes the uppermost layer, and the area fining areas of the managers B1 and B2 are formed with the defining area of the manager A being set as a parent layer. Further, the area defining area of the manager C is formed with the defining area of the manager B1 being set as a parent layer.

The service defining area is allocated to a service supplied from the manager, and the capacity of a service area for storing data necessary to supply services, a service key to generate an access key, etc. are disposed in the service defining area. Here, the service defining area of 1 corresponds to the service defining block of 1 described with reference to FIG. 6.

The service area is a storage areas for storing data necessary to supply services, and it corresponds to the user block of FIG. 6. That is, the service area is constructed by user blocks above 0, and the number of user blocks constituting the service area is disposed as the capacity of the service defining area for managing the service area.

Further, in the area defining area and the service defining area are disposed identification codes for identifying these areas. Here, the identification codes to identify the area defining area and the service defining area are hereinafter referred to as an area code and a service code. The service code is to identify the service defining area for managing a service area, and thus it can be regarded as an identification code (service area identification code) for identifying the service area concerned.

In the embodiment of FIG. 7, the area defining area of the uppermost layer is allocated to the manager A. 0000h to FFFFh are defined as a range of usable identification codes (code range), and 0123456789abcdef are defined as an area key. Here, any identification code may be used as the area code of the area defining area if it is an identification code within the code range in the area defining area. In this embodiment, the minimum value of the code range of the area defining area is used as the area code thereof. Accordingly, the area code of the area defining area whose code range is from 0000h to FFFFh, that is, the area defining areas allocated to the manager A is set to 0000h. Here, the area defining area whose area code is set to #xxxxh is hereinafter described as the area defining area #xxxxh.

The layer of the area defining area #0000h of the manager A is provided with a service defining area in which the manager A supplies services. 0008h of the code range from 0000h to FFFFh of the area defining area #0000h is allocated as a service code to the service defining area. Here, the service defining area of the service code #xxxxh is hereinafter described as the service defining area #xxxxh.

The capacity of the service defining area #0008h is set to 8, and thus the service area constructed by user blocks of 8 is usable. Further, the service key of the service defining area #0008h is set to 0101010101010101.

The layer of the area defining area #0000h of the manager A is provided with an area defining area #0100h of the manager B1 and an area defining area #1000h of the manager B2 as child layers. Further, the layer of the area defining area #0000h is provided with other area defining areas (not shown), and thus the number of blocks (empty capacity) usable by the area defining area #0000h is set to 37 blocks, for example.

As the code range of the area defining area #0100h of the manager B1 are allocated 0100h to 03FFh in the code range from 0000h to FFFFh of the area defining area #0000h which is the parent layer of the area defining area #0100h. Here, since the code range of the area defining area of the manager B1 is from 0100h to 03FFh, 0100h which is the minimum value of the code range is set as the area code of the area defining area of the manager B1. Further, the empty capacity and the area key of the area defining area #0100h are set to 14 and a0a0a0a0a0a0a0a0, respectively.

The layer of the area defining area #0100h of the manager B1 is provided with the area defining area #0300h of the manager C as a child layer thereof. As the code range of the area defining area #0300h of the manager C are allocated 0300h to 03FFh in the code range from 0100h to 03FFh of the area defining area #0100h which is the parent layer thereof. Here, since the code range of the area defining area of the manager C is from 0300h to 03FFh, 0300h which is the minimum of the code range is set as the area code of the area defining area of the manager C.

The empty capacity and area key of the area defining area #0300h are set to 0 and b0b0b0b0b0b0b0b0, respectively.

The layer of the area defining area #0300h of the manager C is provided with a service defining area for service supply by the manager C. 030Ch in the code range from 0300h to 03FFh of the area defining area #0300h is allocated as a service code to the service defining area.

The capacity of the service defining area to which the service code 030Ch is allocated, that is, the service defining area #030Ch is set to 16, and thus the service area constructed by user blocks of 16 can be used. Further, the service key of the service defining area #030Ch is set to 0202020202020202.

Here, the capacity of the service area managed by the service defining area #030Ch is equal to 16, and the service defining area #030Ch itself uses one block as a service defining block, so that the number of blocks being used is equal to 17 (=16+1) because the service defining area #030Ch exists. The number of blocks usable by the area defining area #0300h of a layer to which the service defining area #030Ch belongs is equal to zero block because the empty capacity thereof is equal to zero. Further, the area defining area #0300h itself uses one block as an area defining block. Accordingly, in the layer of the area defining area #0300h, the number of blocks being used is equal to 18 (=17+1) and the number of usable blocks is equal to zero. Therefore, it is found that the number of blocks allocated from the area defining area #0100h serving as its parent layer (upper layer) is equal to 18 (=18+0).

With respect to the layer of the area defining area #0100h, 18 blocks are used in the area defining area #0300h serving as a child layer (lower layer) of the area defining area #0100h as described above. Further, the area defining area #0100h itself uses one block as an area defining block. The empty capacity of the area defining area #0100h is equal to 14 as described above. Accordingly, in the layer of the area defining area #0100h, the number of blocks being used is equal to 19 (=18+1), and the number of usable blocks is equal to 14. Therefore, the number of blocks allocated from the area defining area #0000h serving as the parent layer thereof is equal to 33 (=19+14).

On the other hand, as the code range of the area defining area #1000h of the manager B2 are allocated 1000h to 1FFFh in the code range from 0000h to FFFFh of the area defining area #0000h serving as the parent layer thereof. Here, since the code range of the area defining area of the manager B2 is from 1000h to 1FFFh, 1000h which is the minimum value of the above code range is set as the area code of the area defining area of the manager B2.

Further, the empty capacity and area key of the area defining area #1000h are set to 43 and c0c0c0c0c0c0c0c0, respectively.

The layer of the area defining area #1000h of the manger B2 is provided with a service defining area for the service supply of the manager B2. 1022h in the code range from 1000h to 1FFFh of the area defining area #1000h is allocated as a service code to the service defining area.

The capacity of the service defining area to which the service code 1022h is allocated, that is, the service defining area #1022h is set to 4, and thus a service area constructed by user blocks of 4 can be used. Further, the service key of the service defining area #1022h is set to 0303030303030303.

Here, the capacity of the service area managed by the service defining area #1022h is equal to 4, and the service defining area #1022h itself uses one block as a service defining block, so that the number of blocks being used is equal to 5 (=4+1) because of existence of the service defining area #1022h. Further, the number of blocks usable by the area defining area #1000h of a layer to which the service defining area #1022h belongs is equal to 43 because the empty capacity thereof is equal to 43. Further, the area defining area #1000h itself uses one block as an area defining block. Accordingly, in the layer of the area defining area #1000h, the number of blocks being used is equal to 6 (=5+1), and the number of usable blocks is equal to 43, so that the number of blocks allocated to the area defining area #1000h is equal to 49 (=6+43).

Since the code range serving as the range of identification codes which can be allocated to an area defining area to be managed is stored in the area defining area as described above, such a layer structure as shown in FIG. 7 in which an area defining area of a management target is set as a child layer and an area defining area for managing the area defining area is set as a parent layer can be defined on the basis of the code range.

Next, a process of constructing the layer structure shown in FIG. 7 on the assumption that the manager A to which the area defining area #0000h of the uppermost layer is allocated is a supplier of an IC card 2 will be described with reference to FIG. 8.

The manager A issues the IC card 2 in accordance with the user's request (1). Only the area defining area #000h in the layer structure of FIG. 7 is formed in the IC card 2.

When the manager A starts to supply a predetermined service by using the service area managed by the service defining area #0008h, the manager A registers into the registered card issuing machine 101 information necessary to form the service defining area #0008h (2).

Here, the registered card issuing machine 101 is constructed by R/W1 and the controller 3 shown in FIG. 3, for example. The registered card issuing machine 101 may be disposed in a railway station, a retail store or other facilities.

Thereafter, when a user inserts an IC card 2 into a registered card issuing machine 101 (when the IC card 2 is set to be allowed to communicate with R/W 1 contained in the registered card issuing machine 101), the registered card issuing machine 101 carries out the registered card issuing work, that is, transmits a command and necessary data to the IC card 2 on the basis of registered information to form the service defining area #0008h. Through the above operation, the user is allowed to be supplied with the service of the manager A by using the service area managed by the service defining area #0008h.

On the other hand, when the managers B1, B2 want to be supplied with the service using the IC card 2, each of them makes a contract with the manager A so that the manager A registers into the registered card issuing machine 101 information necessary to form the area defining areas #0100h and #1000h (3), (4). When a user inserts an IC card 2 into the registered card issuing machine 101, the registered card issuing machine 101 performs the registered card issuing work, that is, transmits a command and necessary data to the IC card 2 on the basis of the registered information to form the area defining areas #0100h and #1000h, whereby the managers B1 or B2 can use the resource of the IC card 2 in the range defined in the area defining area #0100h or #1000h. In this case, the registered card issuing dealer for the managers B1 and B2 is the manager A.

Thereafter, when the manager B2 starts to supply a predetermined service by using the service area managed by the service defining area #1022h, the manager B2 registers into the registered card issuing machine 101 information necessary to form the service defining area #1022h (5). When a user inserts an IC card 2 into the registered card issuing machine 101, the registered card issuing machine 101 transmits a command and necessary data to the IC card 2 on the basis of the registered information to form the service defining area #1022h. Therefore, the user can be supplied with the service of the manager B2 using the service area managed by the service defining area #1022h.

Further, when the manager C wishes to supply a service through IC card 2 under the management of the manager B1, the manager C makes a contract with the manager B1 so that the manager B1 registers into the registered card issuing machine 101 information necessary to form the area defining area #0300h (6). When a user inserts an IC card 2 into the registered card issuing machine 101, the registered card issuing machine 101 transmits a command and necessary data to the IC card 2 on the basis of the registered information to form the area defining area #0300h, whereby the manager C can use the resource of the IC card 2 in the range defined in the area defining area #0300h. In this case, the registered card issuing dealer for the manager C is the manager B1.

Thereafter, when the manager C starts to supply a predetermined service by using the service area managed by the service defining area #030Ch, the manager C registers into the registered card issuing machine 101 information necessary to form the service defining area #030Ch (7). When a user inserts an IC card 2 into the registered card issuing machine 101, the registered card issuing machine 101 transmits a command and necessary data to the IC card 2 on the basis of the registered information to form the service defining area #030Ch, whereby the user can accept the supply of the service from the manager C using the service area managed by the service defining area #030Ch.

In the IC card 2, the area defining area and the service defining area are formed according to the command from the registered card issuing machine 101 as described above. The area forming processing of forming the area defining area and the service forming processing of forming the service defining area are performed by the sequencer 91, for example. The area forming processing and the service forming processing will be described with reference to FIGS. 9 and 10.

First, the area forming processing will be described with reference to the flowchart of FIG. 9.

When the IC card 2 is inserted into the registered card issuing machine 101, the registered card issuing machine 101 transmits to the IC card 2 a command instructing to form an area defining area (hereinafter referred to as a define, area forming command), information necessary to form the area defining area, that is, the code range of the area defining area to be formed, the number of blocks allocated to the area defining area (hereinafter referred to as allocation block number) and an area key, for example.

When receiving the area forming command, the IC card 2 (sequencer 91) recognizes the code range of the area defining area to be formed, an allocation block number, an area key, etc. which are transmitted together with the area forming command. Further, in the IC card 2, the area code of the area defining area to be formed is recognized. That is, in this case, the minimum value of the code range of the area defining area to be formed is recognized as the area code thereof. Further, in the IC card 2, the area defining area having the code range containing the code range of the area defining area to be formed is recognized as an area defining area of the parent layer of the area defining area to be formed.

In the IC card 2, it is judged in step S1 whether the area defining area to be formed has been already formed in EEPROM 66. That is, in step S1 it is judged whether the area defining area having the same area code as the area code of the area defining area to be formed has been already formed.

If it is judged in step S1 that the area defining area to be formed has been already formed, the area forming processing is finished. That is, in the case where the area defining area to be formed has been already formed, no subsequent processing is carried out because it is unnecessary to duplicatively form the same area defining area.

If it is judged in step S1 that the area defining area to be formed has not yet been formed, the processing goes to step S2 to judge whether the code range of the area defining area to be formed and the number of allocated blocks (capacity) are proper or not. That is, it is judged in step S2 whether the code range of the area defining area to be formed is contained in the code range stored in the area defining area of the parent layer and the allocation block number of the area defining area to be formed is below the empty capacity stored in the area defining area of the parent layer.

When it is judged in step S2 that the code range of the area defining area to be formed and the allocation block number are not proper, that is, when the code range of the area defining area to be formed is contained in the code range stored in the area defining area of the parent layer or the allocation block number of the area defining area to be formed exceeds the empty capacity stored in the area defining area of the parent layer, the error processing is carried out in step S3 and then the area forming processing is finished. That is, in step S3, a message in which no area defining area can be formed as a child layer of the area defining area of the parent layer is transmitted to the registered card issuing machine 101. Accordingly, in this case, no area defining area is formed (no registered card issuing work is carried out).

On the other hand, if it is judged in step S2 that the code range of the area defining area to be formed and the allocation block number are proper, that is, it is judged that the code range of the area defining area to be formed is contained in the code range stored in the area defining area of the parent layer and the allocation block number of the area defining area to be formed is below the empty capacity stored in the area defining area of the parent layer, the area defining area to be formed is formed as a child layer of the area defining area of the parent layer in step S4.

That is, in step S4, the lowermost block (the empty block having the largest logical address) in the empty blocks of EEPROM 66 (FIG. 6) is ensured as the area defining block corresponding to the area defining area to be formed. Further, the code range, the empty capacity, the area key, etc. are written (stored) into the area defining bock. Here, in step S4, data transmitted from the registered card issuing machine 101 are directly written as the code range and the area key. The value obtained by subtracting 1 from the allocation block number transmitted from the registered card issuing machine 101 is written as the empty capacity. The value obtained by subtracting 1 from the allocation block number is written because the area defining area thus formed uses one block.

Thereafter, the processing goes to step S5 to rewrite the empty capacity of the area defining area of the parent layer, and then the area forming processing is finished. That is, in step S5, the value obtained by subtracting the allocation block number from the empty capacity of the area defining area of the parent layer is newly written as an empty capacity of the area defining area of the parent layer.

The area defining areas #0100h, #1000h, #0300h of the managers B1, B2, C shown in FIG. 7 are formed by the above area forming processing.

That is, assuming that at the issuance time of the IC card 2, the manager A who is also the issuer of the IC card 2 has all the resources of the IC card 2 and the identification codes or the capacity usable by the IC card 2 is from 0000h to FFFFh or 65533 blocks, only the area defining area #0000h of the uppermost layer in which the code range is from 0000h to FFFFh and the empty capacity is equal to 65532 exists as an area defining area at the issuance time of the IC card 2.

In this embodiment, as shown in FIG. 6, EEPROM 66 has blocks of 65536, however, the usable capacity is equal to 65533 blocks whose number is smaller than 65536 by 3 just after issuing the IC card 2 because the manufacturing ID block, the issuance ID block and the system defining block exist.

Further, the empty capacity of the area defining area #0000h of the uppermost layer is equal to 65532 blocks whose number is smaller than the usable capacity of 65533 blocks by one block because the area defining area #0000h itself uses one block.

When the manager A shares the manager B1 the identification codes in the range from 0100h to 03FFh and 33 blocks in the resources thereof, the area forming processing is carried out to form the area defining area #0100h. That is, in this case, 0100h to 03FFh and 32 blocks are written as a code range and an empty capacity respectively into the area defining area #0100h. The empty capacity is smaller than the number of 33 blocks shared from the manager A by one block because the area defining area #0100h itself uses one block.

When the area defining area #0100h is formed, the empty capacity of the area defining area #0000h of the manager A is reduced by 33 blocks shared to the manager B1.

When the manager A shares the manager B2 the identification codes of the range from 1000h to 1FFFh and 49 blocks, the area forming processing is carried out to form the area defining area #1000h. That is, in this case, 1000h to 1FFFh and 48 blocks are written as a code range and an empty capacity respectively into the area defining area #1000h. The empty capacity is smaller than the number of 49 blocks shared from the manager A by one block because the area defining area #1000h itself uses one block.

When the area defining area #1000h is formed, the empty capacity of the area defining area #0000h of the manager A is reduced by 33 blocks shared from the manager B2.

When the area defining area #0100h or #1000h is formed as described above, the manager B1 or B2 is allowed to form in the layer of the area defining area #0100h or #1000h an area defining area and a service defining area as child layers of the above layer.

For example, when the manager B1 shares the manager C the identification codes of the range from 0300h to 03FFh and 18 blocks, the area forming processing is carried out to form the area defining area #0300h. That is, in this case, 0300h to 03FFh and 17 blocks are written as a code range and an empty capacity into the area defining area #0300h. The empty capacity is smaller than the number of 18 blocks shared from the manager B1 by one block because the area defining area #0300h itself uses one block.

When the area defining area #0300h is formed, the empty capacity of the area defining area #0100h of the manager B1 is reduced by the number of 18 blocks shared from the manager C. That is, as described above, the empty capacity of the area defining area #0100h is equal to 32 blocks when the area defining area #0100h is formed. However, as shown in FIG. 7, 18 blocks are reduced from the empty capacity and thus the empty capacity is equal to 14 blocks.

Next, the service forming processing will be described with reference to the flowchart of FIG. 10.

When the IC card 2 is inserted into the registered card issuing machine 101, the registered card issuing machine 101 transmits to the IC card 2 a command instructing to form a service defining area (hereinafter referred to as a service forming command), information necessary to form the service defining area, that is, a service code of the service defining area to be formed, the number of blocks allocated to the service defining area (hereinafter referred to as allocation block number) and a service key, etc.

When the service forming command is received, the IC card 2 (sequencer 91) recognizes the service code of the service defining area to be formed, the allocation block number, the service key, etc. Further, in the IC card 2, the area defining area having the code range containing the service code of the service defining area to be formed is recognized as an area defining area of the parent layer of the service defining area to be formed.

In the IC card 2, it is judged in step S11 whether the service defining area to be formed has been already formed in EEPROM 66. That is, it is judged in the step S11 whether a service defining area having the same service code as the service defining area to be formed has been already formed.

When it is judged in the step S11 that the service defining area to be formed has been already formed, the service forming processing is finished. That is, when the service defining area to be formed has been already formed, the subsequent processing is not carried out because it is not necessary to duplicatively form the same service defining area.

Further, if it is judged in step S11 that the service defining area to be formed has not been formed, the processing goes to step S12 to judge whether the service code of the service defining area to be formed and the allocation block number (capacity) are proper or not. That is, it is judged in step S12 whether the service code of the service defining area to be formed is contained in the code range stored in the area defining area of the parent layer and the allocation block number of the service defining are to be formed is below the empty capacity stored in the area defining area of the parent layer.

If it is judged in step S12 that the service code of the service defining area to be formed and the allocation block number are not proper, that is, if the service code of the service defining area to be formed is not contained in the code range stored in the area defining area of the parent layer or the allocation block number of the service defining area to be formed exceeds the empty capacity stored in the area defining area of the parent layer, the processing goes to step S13 to perform the error processing, and then the area forming processing is finished. That is, in step 33 a message in which no service defining area cannot be formed in the layer of the area defining area of the parent layer is transmitted to the registered card issuing machine 101. Accordingly, in this case, no service defining area can be formed.

On the other hand, it is judged in step S12 that the service code of the service defining area to be formed and the allocation block number are proper, that is, if the service code of the service defining area to be formed is contained in the code stored in the area defining area of the parent layer and the allocation block number of the service defining area to be formed is below the empty capacity stored in the area defining area of the parent layer, the processing goes to step S14 in which the service defining area to be formed is formed in the layer of the area defining area of the parent layer.

That is, in step S14, the lowermost block (an empty block having the largest logical address) in the empty blocks of EEPROM 66 (FIG. 6) is ensured as the service defining block corresponding to the service defining area to be formed. Further, the service code, the capacity, the service key, etc. are written into the service defining block. In this case, in step S14, the service code and the service key transmitted from the registered card issuing machine 101 are directly written. The value obtained by subtracting from the allocation block number transmitted from the registered card issuing machine 101 by 1 is written as the capacity. The value obtained by subtracting the allocation block number by 1 is written because the service defining area to be formed uses one block.

In step S14, empty blocks whose number corresponds to the capacity written in the service defining area thus formed are selected in logical-address increasing order, and ensured as user blocks constituting the service area managed by the service defining area. Thereafter, the processing goes to step S15.

In step S15, the empty capacity of the area defining area of the parent layer is rewritten, and the service forming processing is finished. That is, in step S15, the value obtained by subtracting the allocation block number from the empty capacity of the area defining area of the parent layer is newly written as the empty capacity of the area defining area.

The service defining areas #0008h, #1022h, #030Ch of the managers A, B2, C shown in FIG. 7 are formed by performing the above service forming processing.

That is, when the manager A supplies its services by using the identification code of 0008h and the capacity of 9 blocks in the resources thereof, the service forming processing is carried out to form the service defining area #0008h, and 8 blocks are written as a capacity into the service defining area #0008h. Further, eight empty blocks are ensured as user blocks, and set as a service area managed by the area defining area #0008h. The capacity written in the service defining area #0008h is smaller than the number of 9 blocks by one block because the service defining area #0008h uses one block.

When the service defining area #0008h is formed, the empty capacity of the area defining area #0000h of the manager A is reduced by nine blocks which are shared to the service defining area #0008h.

As described above, the manager A can supply services by using the service area of eight blocks managed by the service defining area #0008h.

When the manager B2 supplies services by using the identification code of 1022h and a capacity of 5 blocks in the resources thereof, the service forming processing is carried out to form the service defining area #1022h, and 4 blocks are written as a capacity into the service defining area #1022h. Further, four empty blocks are ensured as user blocks and it is set as a service area managed by the are a defining area #1022h. The capacity written in the service defining area #1022h is smaller than the number of 5 blocks by one block because the service defining area #1022h itself uses one block.

When the service defining area #1022h is formed, the empty capacity of the area defining area #1000h of the manager B2 is reduced by 5 blocks shared to the service defining area #1022h. That is, as described above, the empty capacity is equal to 48 blocks at the time when the area defining area #1000h is formed, however, it is reduced by 5 blocks and thus equal to 43 blocks as shown in FIG. 7.

As described above, the manager B2 is allowed to supply services by using the service area of four blocks managed by the service defining area #1022h.

Further, when the manager C supplies services by using, for example, the identification code of 030Ch and the capacity of 17 blocks in the resources thereof, the service forming processing is carried out to form the service defining area #030Ch, and 16 blocks are written as a capacity into the service defining area #030Ch. Further, 16 empty blocks are ensured as user blocks, and it is set as a service area managed by the area defining area #030Ch. The capacity written in the service defining area #030Ch is smaller than the number of 17 blocks by one block because the service defining area #030Ch itself uses one block.

When the service defining area #030Ch is formed, the empty capacity of the area defining area #0300h of the manager C is reduced by 17 blocks shared to the service defining area #030Ch. That is, as described above, the empty capacity is equal to 17 blocks at the time when the area defining area #0300h is formed, however, it is reduced by 17 blocks and thus equal to zero as shown in FIG. 7.

As described above, the manager C is allowed to supply services by using the service area of 16 blocks managed by the service defining area #030Ch.

As described above, EEPROM 66 is managed on the basis of the area defining area in which the code range and the empty capacity are stored, so that the resource management of the IC card 2 can be performed. That is, the capacity and identification codes which are usable in the layer of an area defining area can be restricted. As a result, even when a manager shares a part of resources allocated thereto (in this case, usable capacity and identification codes) to another manager so that the IC card 2 is commonly usable, the identification code can be prevented from being overlapped between different managers and the manager can be prevented from using EEPROM 66 with exceeding a capacity which is predetermined through a contract or the like.

In the IC card 2, the storage area of EEPROM 66 has the layer structure in which the area defining area is layered as described with respect to FIG. 7, and keys for certification (in this embodiment, a key for an area defining area and a key for a service defining area are referred to as an area key and a service key respectively) are stored in the area defining area and the service defining area respectively, so that access control which is high in flexibility and safety to the IC card 2 can be performed.

Figure 11:
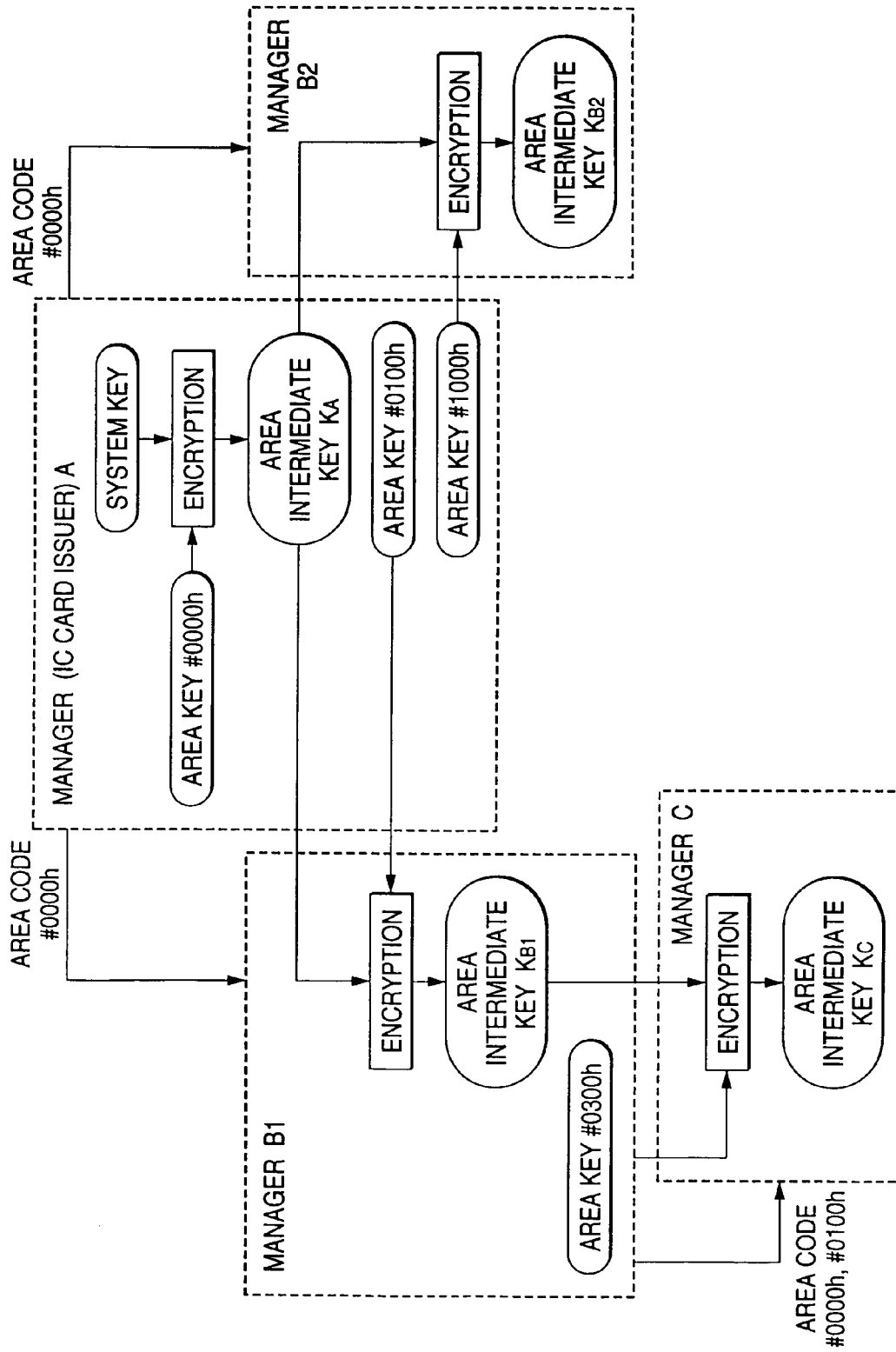
FIG. 11 is a diagram showing key reception/delivery between managers.

That is, access control which is high in flexibility and safety to the IC card 2 can be implemented by delivering information as shown in FIG. 11 between managers. Specifically, the manager A which also serves as the issuer of the IC card 2 determines a system key to be stored in the system defining block of EEPROM 66 (FIG. 6) and an area key of the area defining area #0000h of itself, and stores the system key in the system defining block while storing the area key #0000h in the area defining area #0000h. Here, the area key of the area defining area #xxxxh is hereinafter referred to as area key #xxxxh.

Further, the manager A encrypts the system key with the area key #0000h and generates an area intermediate key $K_A$. DES (Data Encryption Standard), FEAL (Fast Data Encipherment Algorithm) or the like may be used as an encrypting method.

When the manager A shares the resources thereof to the manager B1, the manager A gives the area intermediate key $K_A$ to the manager B1. Further, the manager A determines the area key #0100h of the manager B1 and gives (distributes) it to the manager B1 together with the area code #0000h thereof.

Accordingly, the manager B1 can recognize the area intermediate key $K_A$ and the area key #0100h thereof, however it cannot recognize the system key and the area key #0000h of the manager A which is a so-called parent. However, the area key #0100h of the manager B1 is given to the manager B1 serving as a so-called child by the manager A serving as the parent, and thus the manager A serving as the parent recognizes the area key #0100h of the manager B1 serving as the child.

The area key #0100h given to the manager B1 by the manager A is written into the area defining area #0100h through the area forming processing (FIG. 9) of the area defining area #0100h of the manager B1.

The manager B1 encrypts the area intermediate key $K_A$ obtained from the manager A serving as the parent thereof on the basis of the area key #0100h obtained from the manager A to generate an area intermediate key $K_{B1}$.

The manager A also gives the area intermediate key $K_A$ to the manager B2 when it shares the resources thereof to the manager B2. Further, the manager A determines the area key #1000h of the manager B2, and gives it to the manager B2 together with the area code #0000h thereof.

Accordingly, the manager B2 can recognize the area intermediate key $K_A$ and the area key #1000h thereof, however, cannot recognize the system key and the area key #0000h of the manager A serving as the parent. However, since the area key #1000h of the manager B2 is given to the manager B2 serving as the child by the manager A serving as the parent, the manager A serving as the parent recognizes the area key #1000h of the manager B2 serving as the child.

The area key #1000h given to the manager B2 by the manager A is written into the area defining area #1000h thereof in the area forming processing of the area defining area #1000h of the manager B2.

The manager B2 encrypts the area intermediate key $K_A$ obtained from the manager A serving as the parent thereof on the basis of the area key #1000h obtained from the manager A to generate an area intermediate key $K_{B2}$.

On the other hand, when the manager B1 shares the resources thereof to the manager C, the manager B1 gives the area intermediate key $K_{B1}$ to the manager C. Further, the manager B1 determines the area key #0300h of the manager C and gives it to the manager C together with the area code #0100h thereof and the area code #0000h of the manager A serving as the parent.

Accordingly, the manager C can recognize the area intermediate key $K_{B1}$ and the area key #03000h thereof, however, cannot recognize the area key #0100h of the manager B1 serving as the parent. However, since the area key #0100h is given to the manager C serving as the child by the manager B1 serving as the parent, the manager B1 serving as the parent recognizes the area key #0300h of the manager C serving as the child.

The area key #0300h given to the manager C by the manager B1 is written in the area defining area #0300h thereof through the area forming processing of the area defining area #0300h of the manager C.

The manager C encrypts the area intermediate key $K_{B1}$ obtained from the manager B1 serving as the parent on the basis of the area key #0300h obtained from the manager B1 to generate an area intermediate key KC.

Figure 12:
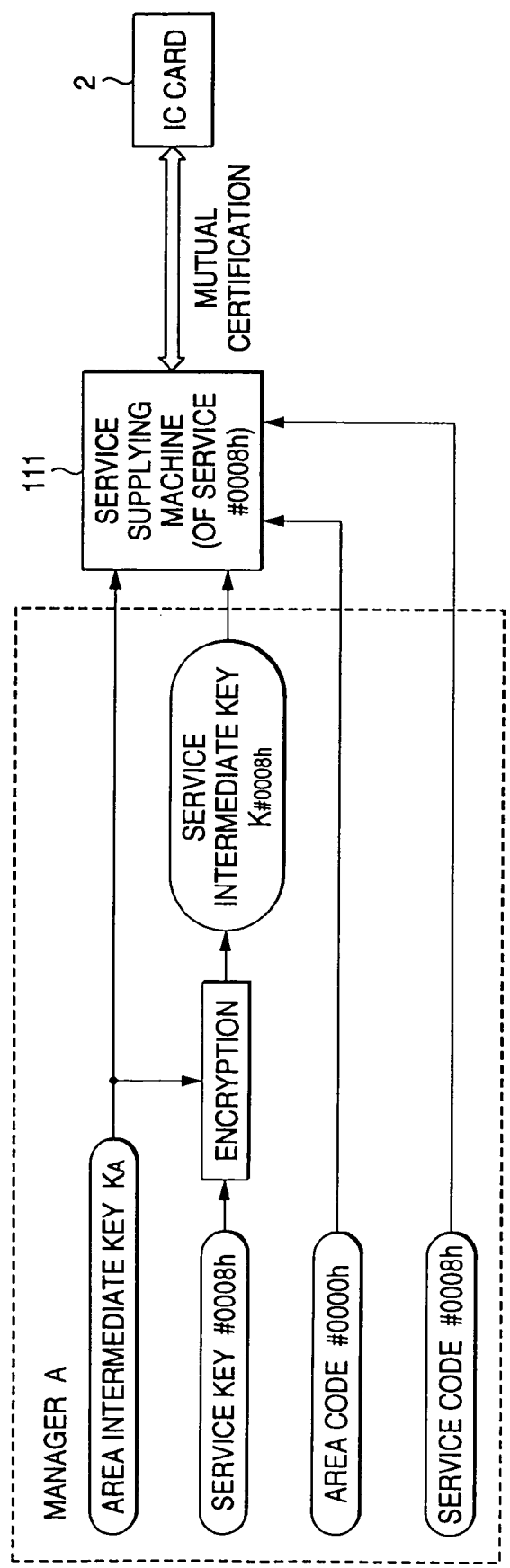
FIG. 12 is a diagram showing information necessary when a manager A supplies services.

When the manager A supplies its services by using the service area managed by the service defining area #0008h formed in the layer of the area defining area #0000h thereof, as shown in FIG. 12, the manager A encrypts the service key stored in the service defining area #0008h (the service key stored in the service defining area #xxxxh is hereinafter referred to as a service key #xxxxh) on the basis of the area intermediate key $K_A$ to generate a service intermediate key $K_{\#0008h}$, and registers it into a service supply machine 111 together with the area intermediate key $K_A$. Further, the manager A registers the area code #0000h of the area defining area #0000h thereof and the service code #0008h of the service defining area #0008h formed in the layer of the area defining area #0000h into the service supply machine 111.

Here, the service supply machine 111 is constructed by R/W 1 and the controller 3 shown in FIG. 3, for example, and data are read/written from/in a predetermined area to supply a predetermines service.

In this case, when the IC card 2 is inserted into the service supply machine 111, the following mutual certification is carried out between the service supply machine 111 and the IC card 2.

Figure 13:
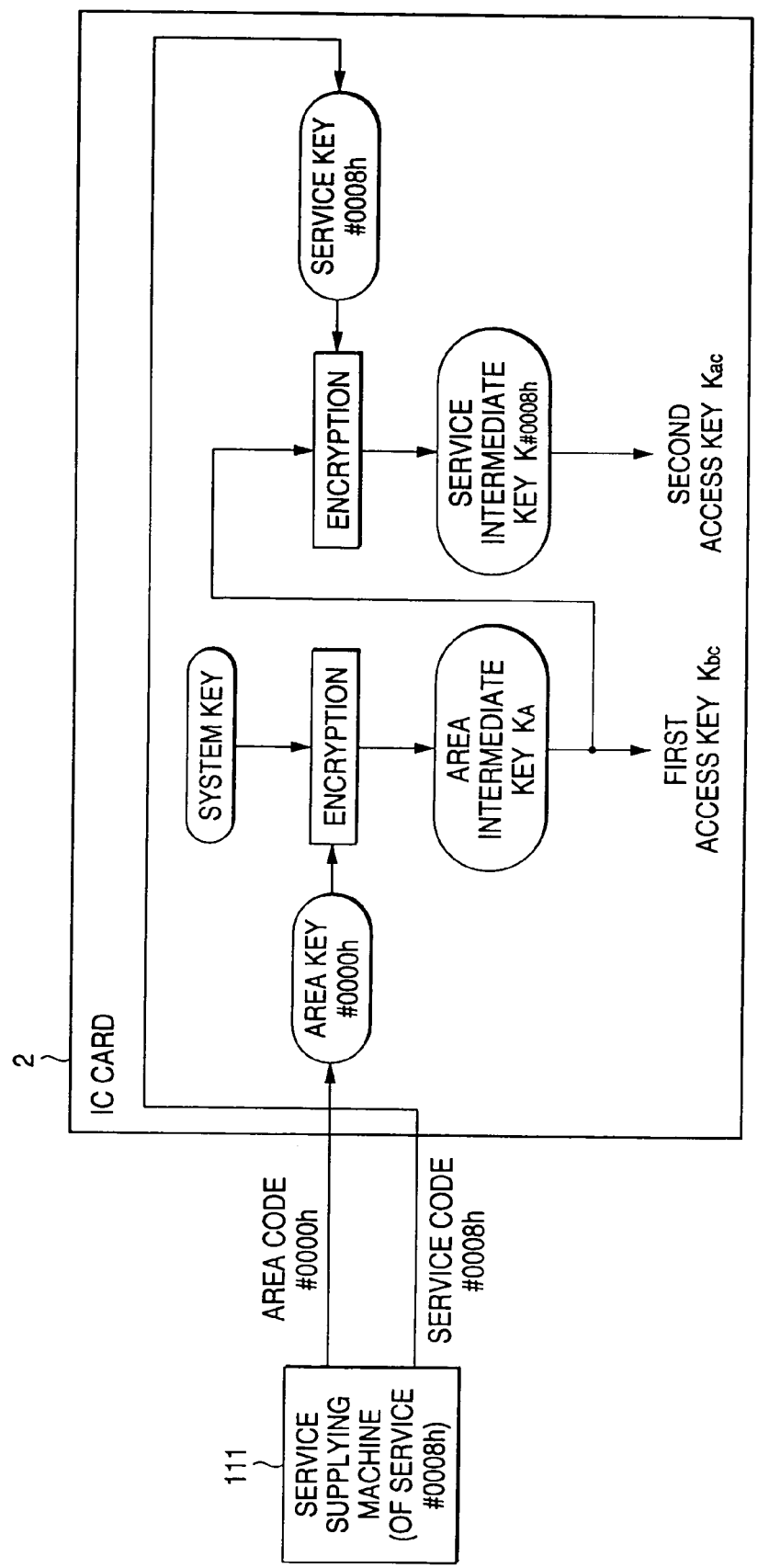
FIG. 13 is a diagram showing the processing of the IC card 2 when the manager A supplies services.

That is, the service supply machine 111, as shown in FIG. 13, transmits the area code #0000h and the service code #0008h registered to the IC card 2. In the IC card 2 (sequence 91), the area code #0000h and the service code #0008h from the service supply machine 111 are received.

In the IC card 2, the system key stored in the system defining block (FIG. 6) is read out, and also the area key #0000h is read out from the area defining area having the area code #0000h received from the service supply machine 111. Further, the system key is encrypted on the basis of the area key #0000h, so that the same key as the area intermediate key $K_A$ registered in the service supply machine 111 of FIG. 12 is generated. The same key as the area intermediate key $K_A$ is set as a first access key (certification key) $K_{bc}$ used for certification.

In the IC card 2, the service key #0008h is read from the service defining area having the service code #0008h received from the service supply machine 111. The area intermediate key $K_A$ is encrypted on the basis of the service key #0008h, so that the same key as the service intermediate key $K_{\#0008h}$ registered in the service supply machine 111 of FIG. 12 is generated. The same key as the service intermediate key $K_{\#0008h}$ is set as a second access key $K_{ac}$ used for certification.

Accordingly, in this case, the area intermediate key $K_A$ or the service intermediate key $K_{\#0008h}$ which serves as the first access key $K_{bc}$ or the second access key $K_{ac}$ is registered in the service supply machine 111, whereby the area intermediate key $K_A$ or the service intermediate key $K_{\#0008h}$ serving as the first access key $K_{bc}$ or the second access key $K_{ac}$ is generated in the IC card 2.

Figure 14:
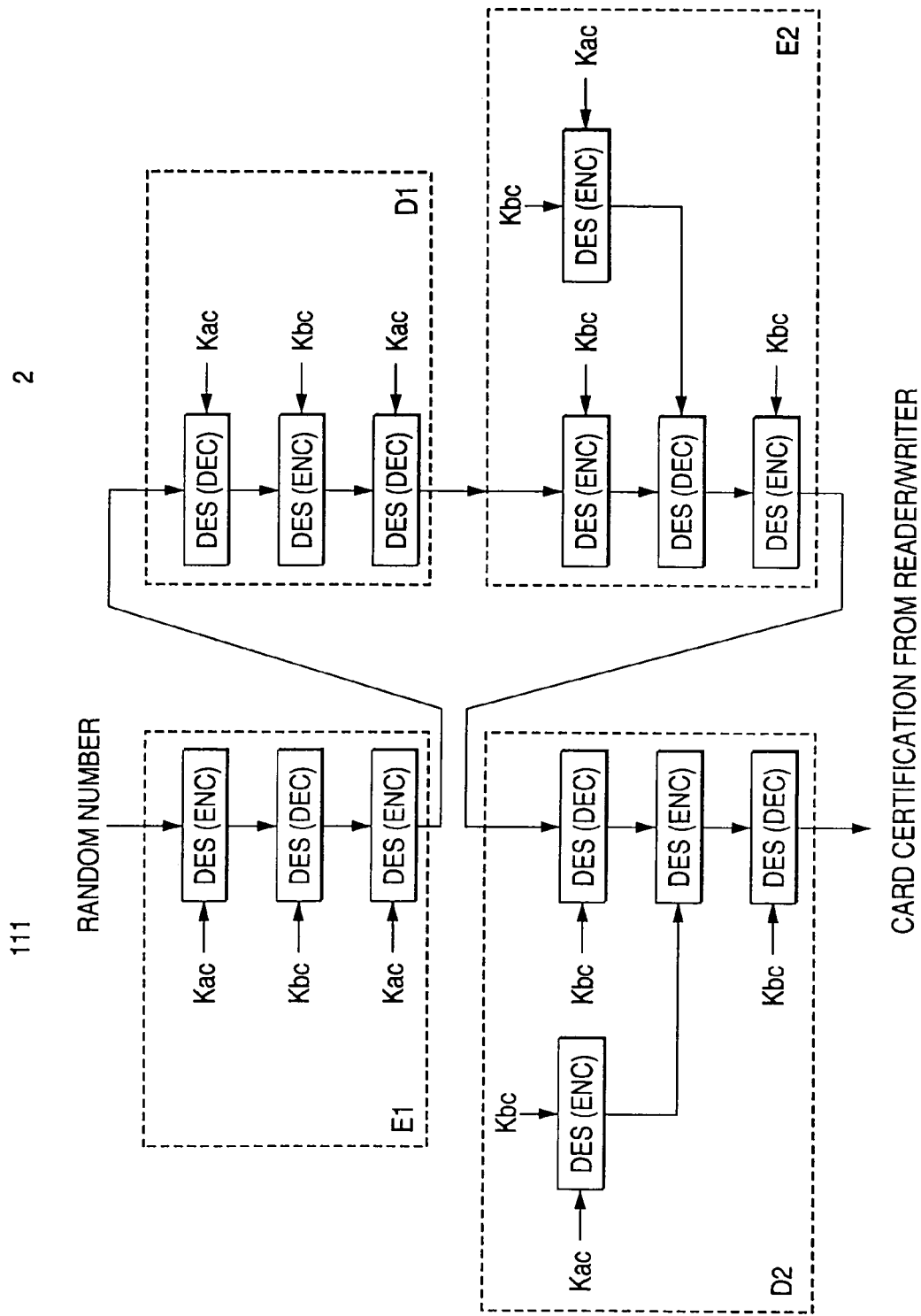
FIG. 14 is a diagram showing a certification method of the IC card 2 by a service supply apparatus 111.

The service supply machine 111 certificates the IC card 2 as shown in FIG. 14, for example.

That is, in the service supply machine 111, a random number is generated, and it is converted according to an algorithm E1. That is, the random number is encrypted (for example, DES-encrypted) on the basis of the second access key $K_{ac}$, and the encryption result is decoded (for example, DES-decoded) on the basis of the first access key $K_{bc}$. The decoding result is encrypted on the basis of the second access key $K_{ac}$. The conversion result of the random number based on the algorithm E1 is transmitted to the IC card 2.

In the IC card 2, the conversion result of the random number based on the algorithm E1 from the service device 111 is converted according to the algorithm D1. That is, the conversion result based on the algorithm E1 is decoded on the basis of the second access key $K_{ac}$, and the decoding result is encrypted on the basis of the first access key $K_{bc}$. Further, the encryption result is decoded on the basis of the second key $K_{ac}$.

In the IC card 2, the conversion result based on the algorithm D1 is further converted according to the algorithm E2. That is, the conversion result based on the algorithm D1 is encrypted on the basis of the first access key $K_{bc}$, and the first access key $K_{bc}$ is encrypted on the basis of the second access key $K_{ac}$. The encryption result based on the first access key $K_{bc}$ for the conversion result based on the algorithm D1 is decoded on the basis of the encryption result based on the second access key $K_{ac}$ of the first access key $K_{bc}$. The decoding result is encrypted on the basis of the first access key $K_{bc}$ and transmitted to the service supply machine 111.

In the service supply machine 111, the conversion result based on the algorithm E2 from the IC card 2 is converted according to the algorithm D2. That is, the conversion result based on the algorithm E2 is decoded on the basis of the first access key $K_{bc}$, and the first access key $K_{bc}$ is encrypted on the basis of the second access key $K_{ac}$. The decoding result based on the first access key $K_{bc}$ for the conversion result based on the algorithm E2 is encrypted on the basis of the encryption result of the first access key $K_{bc}$ based on the second access key $K_{ac}$. The encryption result is decoded on the basis of the first access key $K_{bc}$.

In the service supply machine 111, the original random number and the conversion result based on the algorithm D2 are compared with each other to certificate the IC card 2. That is, when the original number is coincident with the conversion result based on the algorithm D2, it is recognized that the IC card 2 is proper. On the other hand, if they are not coincident with each other, the IC card 2 is regarded as being improper (for example, it is forged).

Figure 15:
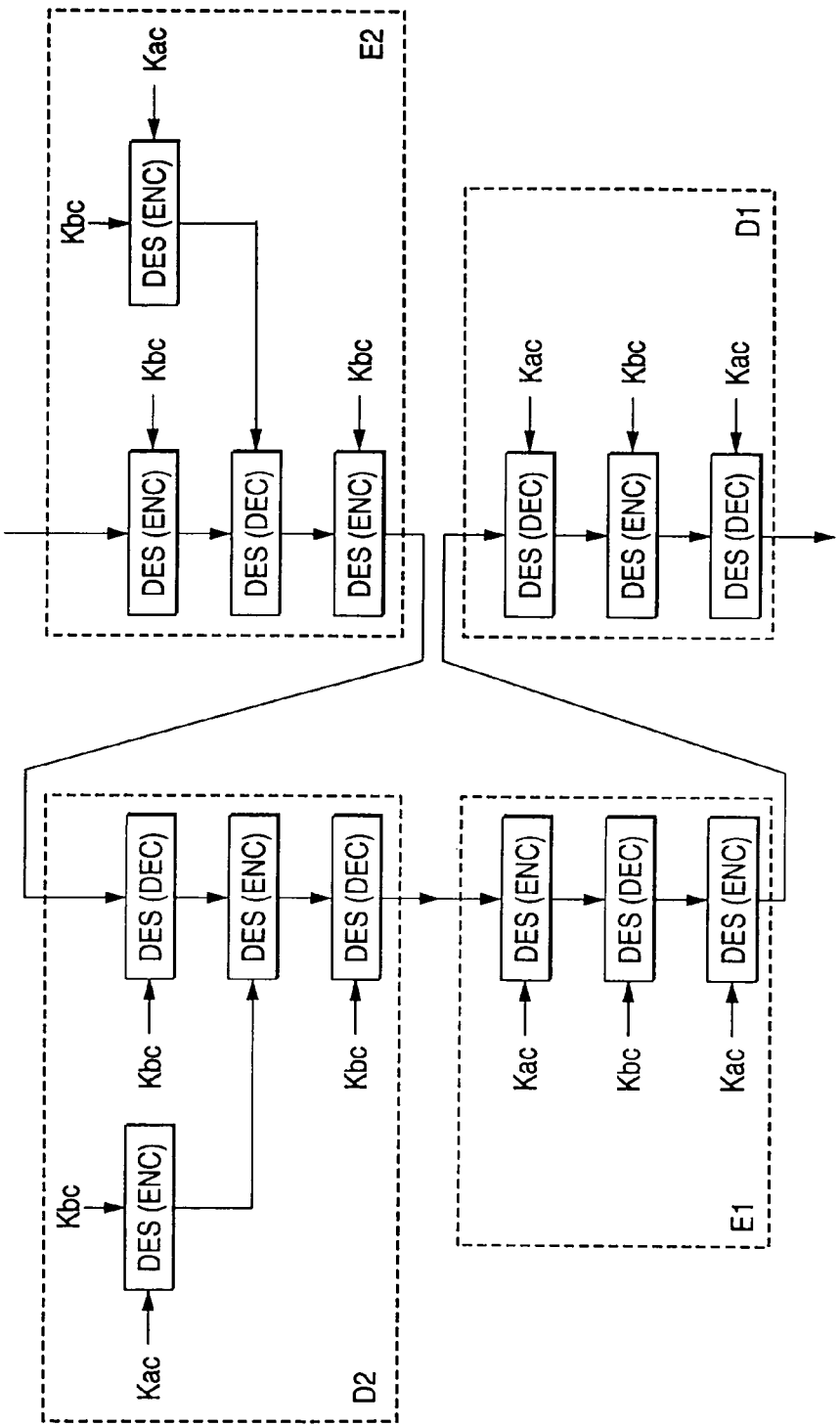
FIG. 15 is a diagram showing the certification method of the service supply apparatus 111 by the IC card 2.

If the IC card 2 is recognized to be proper, the certification of the service supply machine 111 is carried out in the IC card 2 as shown in FIG. 15, for example, That is, in the IC card 2, the random number is generated, and the random number is converted according to the algorithm E2 and transmitted to the service supply machine 111.

In the service supply machine 111, the conversion result of the random number based on the algorithm E2 from the IC card 2 is converted according to the algorithm D2. Further, the conversion result based on the algorithm D2 is converted according to the algorithm E1 and transmitted to the IC card 2.

In the IC card 2, the conversion result based on the algorithm E1 from the service supply machine 111 is converted according to the algorithm D1, and the conversion result and the original random number are compared with each other to perform the certification for the service supply machine 111. That is, when the original random number is coincident with the conversion result based on the algorithm D2, the service supply machine 111 is recognized as being proper. On the other hand, if they are not coincident with each other, the service supply machine 111 is recognized as being improper (for example, modified).

When both of the IC card 2 and the service supply machine 111 are recognized to be proper, an access to only the service area managed by the service defining area having the service code transmitted from the service supply machine 111 is permitted in the IC card 2. Accordingly, in the case described with respect to FIGS. 12 and 13, an access to only the service area managed by the service defining area #0008h is possible.

That is, the manager A who knows the area intermediate key $K_A$, the area code #0000h, the service key #0008h and the service code #0008h can access the service area managed by the service defining area #0008h. However, the manager A knows neither the service key #1022h nor the service key #030Ch, so that it cannot basically access the service area managed by the service defining area #1022h or #030Ch.

Next, when the manager B2 supplies its services by using the service area managed by the service defining area

Figure 16:
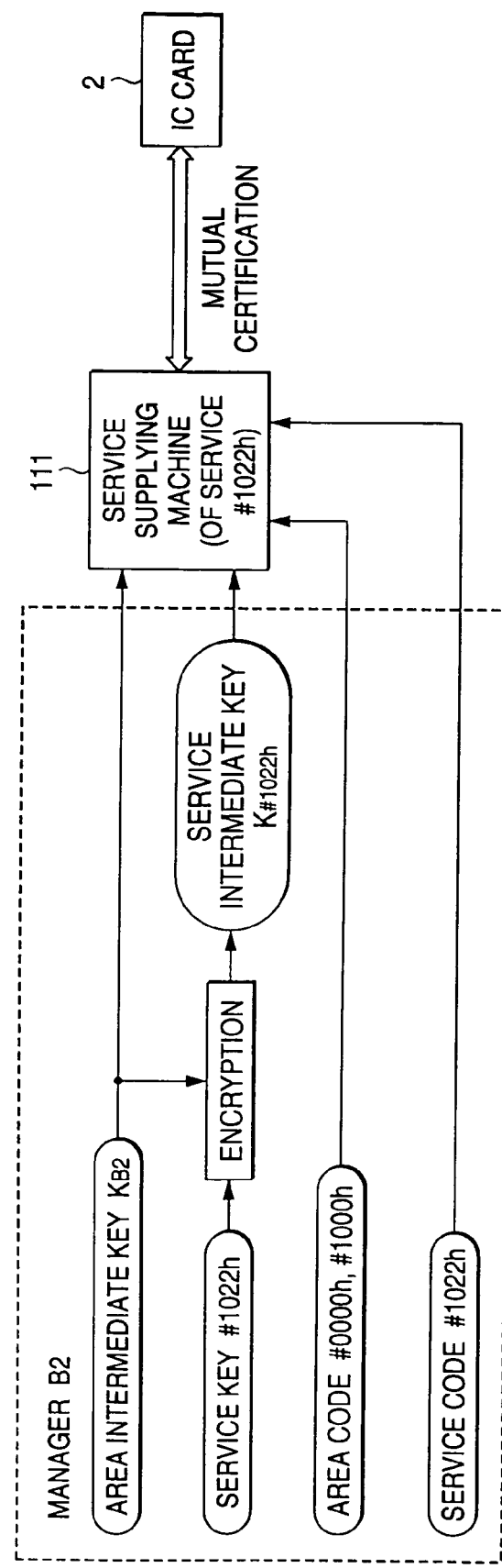
FIG. 16 is a diagram showing information necessary when a manager B2 supplies services.

1022h formed in the layer of the area defining area #1000h thereof, it encrypts the service key #1022h stored in the service defining area #1022h on the basis of the area intermediate key $K_{B2}$ as shown in FIG. 16 to generate a service intermediate key $K_{\#1022h}$, and register it together with the area intermediate key $K_{B2}$ into the service supply machine 111. The manager B2 registers into the service supply machine 111 the area code of the area defining area of an upper layer above the layer of the area defining area #1000h thereof, that is, in this case, the area code #000h of the area defining area #0000h of the manager A and the area code #1000h of the area defining area #1000h thereof, and the service code #1022h of the service defining area #1022h formed in the layer of the area defining area #1000h.

In this case, when the IC card 2 is inserted into the service supply machine 111, the following mutual certification is carried out between the service supply machine 111 and the IC card 2.

Figure 17:
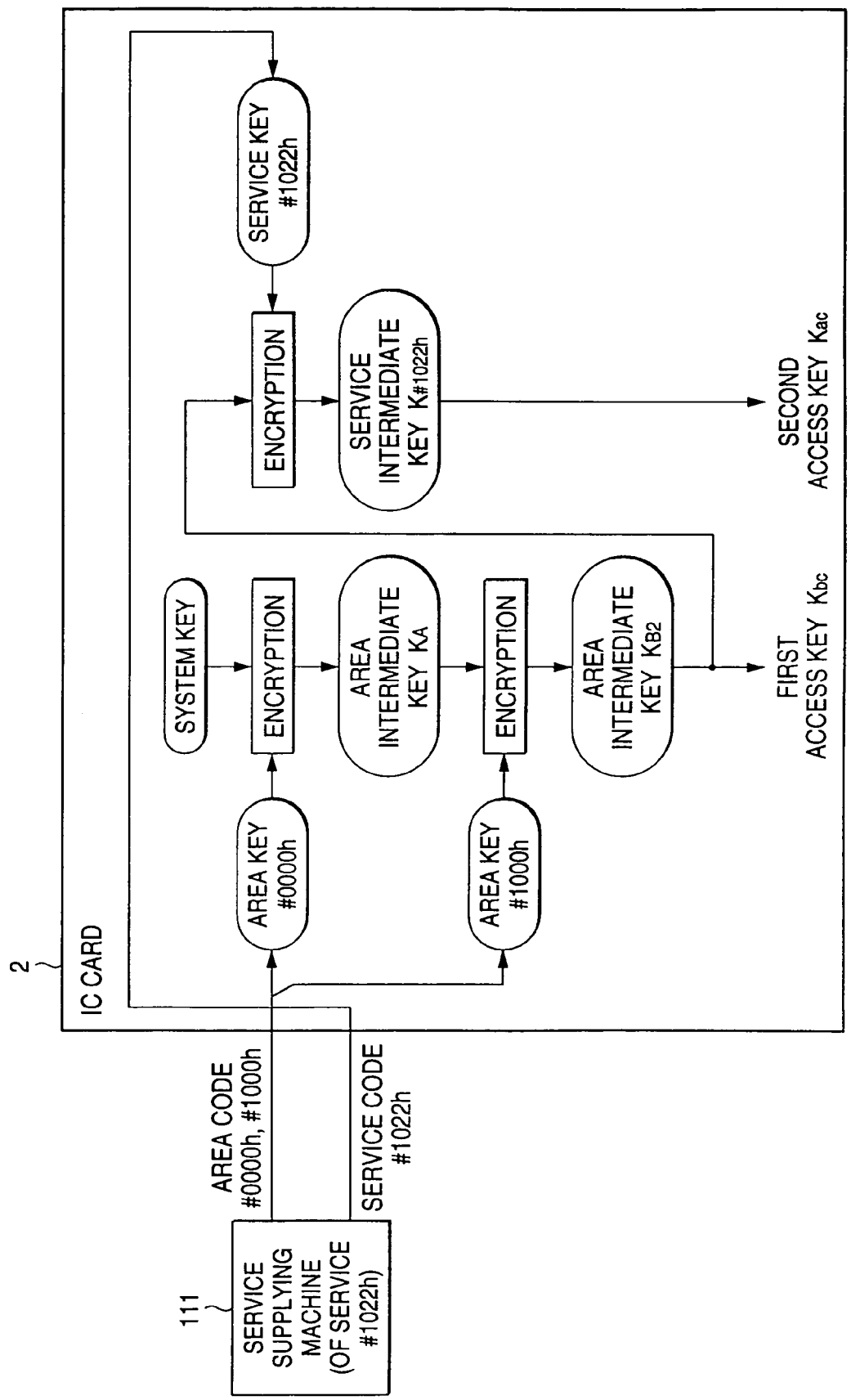
FIG. 17 is a diagram showing the processing of the IC card 2 when the manager B2 supplies services.

That is, as shown in FIG. 17, the service supply machine 111 transmits the registered area codes #0000h and #1000h, and the service code #1022h to the IC card 2. In the IC card 2 (sequencer 91), the area codes #0000h and #1000h and the service code #1022h are received from the service supply machine 111.

In the IC card 2, the system key stored in the system defining block (FIG. 6) is read out, and the area key #0000h or #1000h is read out from the area defining area having the area code #0000h or #1000h received from the service supply machine 111. Further, the system key is encrypted on the basis of the area key #0000h, so that the same key as the area intermediate key $K_A$ is generated. The same key as the area intermediate key $K_A$ is encrypted on the basis of the area key #1000h, so that the same key as the area intermediate key $K_{B2}$ registered in the service supply machine 111 of FIG. 16 is generated. The same key as the area intermediate key $K_{B2}$ is set as a first access key $K_{bc}$ used for certification.

In the IC card 2, the service key #1022h is read out from the service defining area having the service code #1022h received from the service supply machine 111. The same key as the area intermediate key $K_{B2}$ is encrypted on the basis of the service key #1022h, so that the same key as the service intermediate key $K_{\#1022h}$ registered in the service supply machine 111 of FIG. 16 is generated. The same key as the service intermediate key $K_{\#1022h}$ is set as a second access key $K_{ac}$ used for certification.

Accordingly, in this case, the area intermediate key $K_{B2}$ or the service intermediate key $K_{\#1022h}$ which is the first access key $K_{bc}$ or the second access key $K_{ac}$ is registered in the service supply machine 111, and in the IC card 2 the area intermediate key $K_{B2}$ or the service intermediate key $K_{\#1022h}$ which is the first access key $K_{bc}$ or the second access key $K_{ac}$ is generated.

The mutual certification is carried out between the IC card 2 and the service supply machine 111 as in the case as described with reference to FIGS. 14 and 15.

As a result of the mutual certification, when both the IC card 2 and the service supply machine 111 are recognized to be proper, the access to only the service area managed by the service defining area having the service code transmitted from the service supply machine 111 is permitted in the IC card 2. Accordingly, in the case of FIGS. 16 and 17, the access to only the service area managed by the service defining area #1022h is possible.

That is, the manager B2 who knows the area intermediate key $K_{B2}$ the area codes #0000h, #1000h, the service key #1022h and the service code #1022h can access the service area managed by the service defining area #1022h. However, the manager B2 knows neither the service key #0008h nor #030Ch, and thus it cannot basically access the service areas managed by the service defining areas #0008h and #030Ch.

Figure 18:
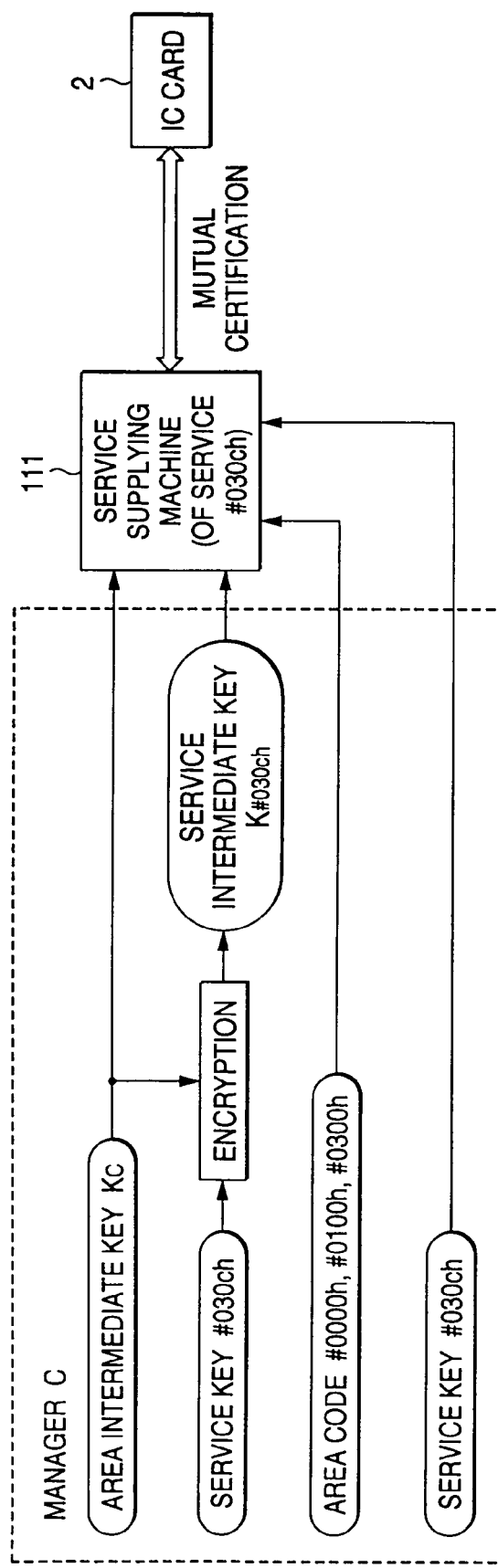
FIG. 18 is a diagram showing information necessary when a manager C supplies services.

Next, when the manager C supplies the services by using the service area managed by the service defining area #030Ch formed in the layer of the area defining area #0300h thereof, it encrypts the service key #030Ch stored in the service defining area #030Ch on the basis of the area intermediate key $K_C$ as shown in FIG. 18 to generate a service intermediate key $K_{\#030Ch}$, and registers it together with the area intermediate key $K_c$ into the service supply machine 111. The manager C also registers into the service supply machine 111 the area code of the area defining area of an upper layer above the layer of the area defining area #0300h thereof, that is, in this case, the area code #0000h of the area defining area #0000h of the manager A, the area code 0100h of the area defining area #0100h of the manager B1, the area code #0300h of the area defining area #0300h thereof and the service code #030Ch of the service defining area #030Ch formed in the layer of the area defining area #0300h.

In this case, when the IC card 2 is inserted into the service supply machine 111, the following mutual certification is carried out between the service supply machine 111 and the IC card 2.

Figure 19:
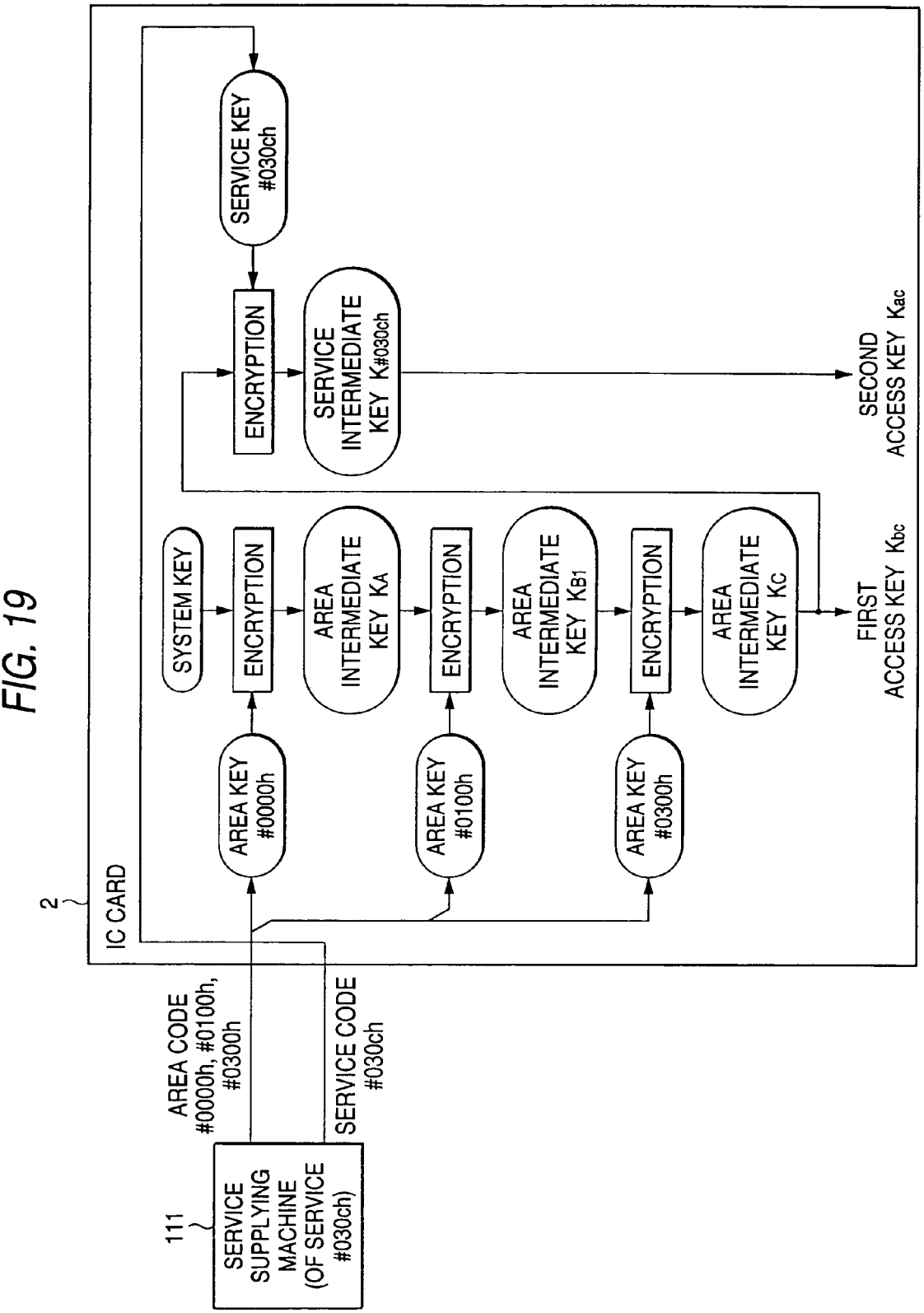
FIG. 19 is a diagram showing the processing of the IC card 2 when the manager C supplies services.

That is, as shown in FIG. 19, the registered area codes #0000h, #0100h and #0300h and the service code #030Ch are transmitted to the IC card 2. In the IC card 2 (sequencer 91), the area codes #0000h, #0100h and #0300h and the service code #030Ch are received from the service supply machine 111.

In the IC card 2, the system key stored in the system defining block (FIG. 6) is readout, and also the area key #0000h, #0100h or #0300h is read out from the area defining area having the area code #0000h, #0100h or #0300h which is received from the service supply device 111. Further, the system key is encrypted on the basis of the area key #0000h, so that the same key as the area intermediate key $K_A$ is generated. The same key as the area intermediate key $K_A$ is encrypted on the basis of the area key #0100h, so that the same key as the area intermediate key $K_{B1}$ is generated. The same key as the area intermediate key $K_{B1}$ is encrypted on the basis of the area key #0300h, so that the same key as the area intermediate key KC registered in the service supply machine 111 of FIG. 18 is generated. The same key as the area intermediate key $K_C$ is set as a first access key $K_{bc}$ used for certification.

In the IC card 2, the service key #030Ch is read out from the service defining area having the service code #030Ch received from the service supply machine 111. The area intermediate key $K_C$ is encrypted on the basis of the service key #030Ch, thereby generating the same key as the service intermediate key $K_{\#030Ch}$ registered in the service supply machine 111 of FIG. 18. The same key as the service intermediate key $K_{\#030Ch}$ is set as a second access key $K_{ac}$ used for certification.

Accordingly, in the above case, the area intermediate key $K_C$ or the service intermediate key $K_{\#030Ch}$ which is the first access key $K_{bc}$ or the second access key $K_{ac}$ is registered in the service supply machine 111, and the area intermediate key KC or the service intermediate key K#$_{030}$ ch which is the first access key $K_{bc}$ or the second access key $K_{ac}$ is generated in the IC card 2.

The mutual certification is carried out between the IC card 2 and the service supply machine 111 as in the case of FIGS. 14 and 15.

As a result of the mutual certification, if both the IC card 2 and the service supply machine 111 are recognized as being proper, an access to only the service area managed by the service defining area having the service code transmitted from the service supply machine 111 is permitted in the IC card 2. Accordingly, in the case of FIGS. 18 and 19, the access to only the service area managed by the service defining area #030Ch is possible.

That is, the manager C which knows the area intermediate key $K_c$, the area codes #0000h, #0100h, #0300h, the service key #030Ch and the service code #030Ch can access the service area managed by the service defining area #030ch. However, the manager C knows neither the service key #0008h nor the service key #1022Ch, and basically, it cannot access the service area managed by the service defining area #0008h or #1022Ch.

As described above, the manager can access the service area thereof even when it does not know the area key of the upper layer.

As described above, each manager cannot access any service area managed by a service defining area for which the manager does not the service key. However, for example, there is a case where the manager C wishes to perform not only services using the service area managed by the service defining area #030Ch thereof, but also services using the service area managed by the service defining area #1022h of the manager B.

In this case, in order for the manager C to access the service area managed by the service defining area #1022h, it is necessary for the manager C to know the area intermediate key $K_{B2}$, the area codes #0000h, #1000h, the service key #1022h and the service code #1022h as described with reference to FIGS. 16 and 17. Accordingly, it is necessary to gain these information from the manger B2.

However, the service key #1022h known by the manager B2 is not known by even the manager A serving as the parent of the manager B2, and thus it is unfavorable from the viewpoint of security that the service key #1022h which is allowed to be known by only the manager B2 is informed to the manager C.

In this case, even when the security problem is neglected, in order for the manager C to access both the two service areas managed by the service defining area #030Ch or #1022h respectively, it is necessary to carry out the processing shown in FIG. 17 in the IC card 2 to generate the first access key $K_{bc}$ and the second access key $K_{ac}$ and perform mutual certification for an access to the service area managed by the service defining area #030Ch, and also carry out the processing shown in FIG. 19 to generate the first access key $K_{bc}$ and the second access key $K_{ac}$ and perform mutual certification for an access to the service area managed by the service defining area #1022h.

Accordingly, when the mutual certification for an access to a service area is carried out every service area, it is difficult to access the service area quickly. As a result, when the card system of FIG. 3 is applied to the examination of tickets in a station, it is difficult to access a predetermined service area of the IC card 2 and write or read data during a relatively short period in which a commuter passes through a gate provided at a ticket barrier.

Figure 20:
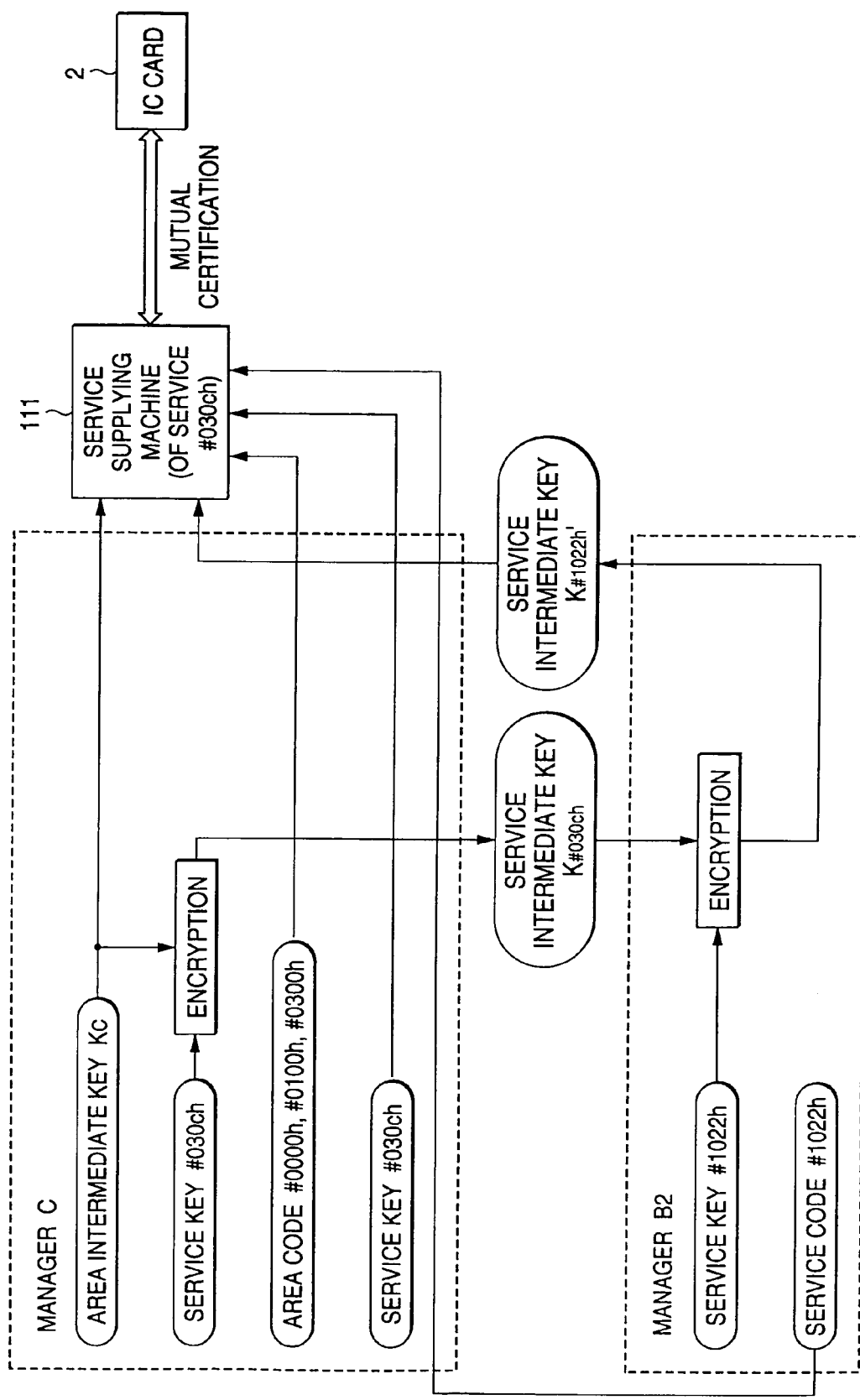
FIG. 20 is a diagram showing information necessary when the manager C supplies services.

Therefore, in a case where the manager C supplies not only services using the service area managed by the service defining area #030Ch thereof, but also services using the service area managed by the service defining area #1022h of the manager B2, in order to solve the security problem and ensure a quick access to the service area, information delivery as shown in FIG. 20 is carried out between the managers C and B2 and registered into the service supply machine 111.

That is, the manager C encrypts the service key #030Ch stored in the service defining area #030Ch on the basis of the area intermediate key $K_C$ as in the case of FIG. 18 to generate the service intermediate key $K_{\#030Ch}$. Further, the manager C delivers the service intermediate key $K_{\#030Ch}$ to the manager B2 to encrypt it on the basis of the service key #1022h. The manager C receives the service intermediate key $K_{\#1022h}$, which is an encryption result of the service intermediate key $K_{\#030Ch}$ on the basis of the service key #1022h, together with the service code #1022h.

Accordingly, only the service intermediate keys $K_{\#030Ch}$ and $K_{\#1022h}$, are delivered between the managers C and B2, and there is neither a case where the service key #030Ch which is known by only the manager C is known by the manager B2, nor a case where the service key #1022h which is known by only the manager B2 is known by the manager C. That is, there is no problem in security.

The manager C which receives the service intermediate key $K_{\#1022h}$, and the service code #1022h from the manager B2 registers into the service supply machine 111 the area codes of the area defining areas in upper layers above the layer of the area defining area #0300h thereof, that is, in this case, the area code #0000h of the area defining area #0000h of the manager A, the area code 0100h of the area defining area #0100h of the manager B1 and the area code #0300h of the area defining area #0300h of the manager C. Further, the manager C registers into the service supply machine 111 the are intermediate key $K_C$ and the service code #030ch of the service defining area #030Ch formed in the layer of the area defining area #0300h.

In this case, when the service supply machine 111 is inserted into the IC card 2, the following mutual certification is carried out between the service supply machine 111 and the IC card 2.

Figure 21:
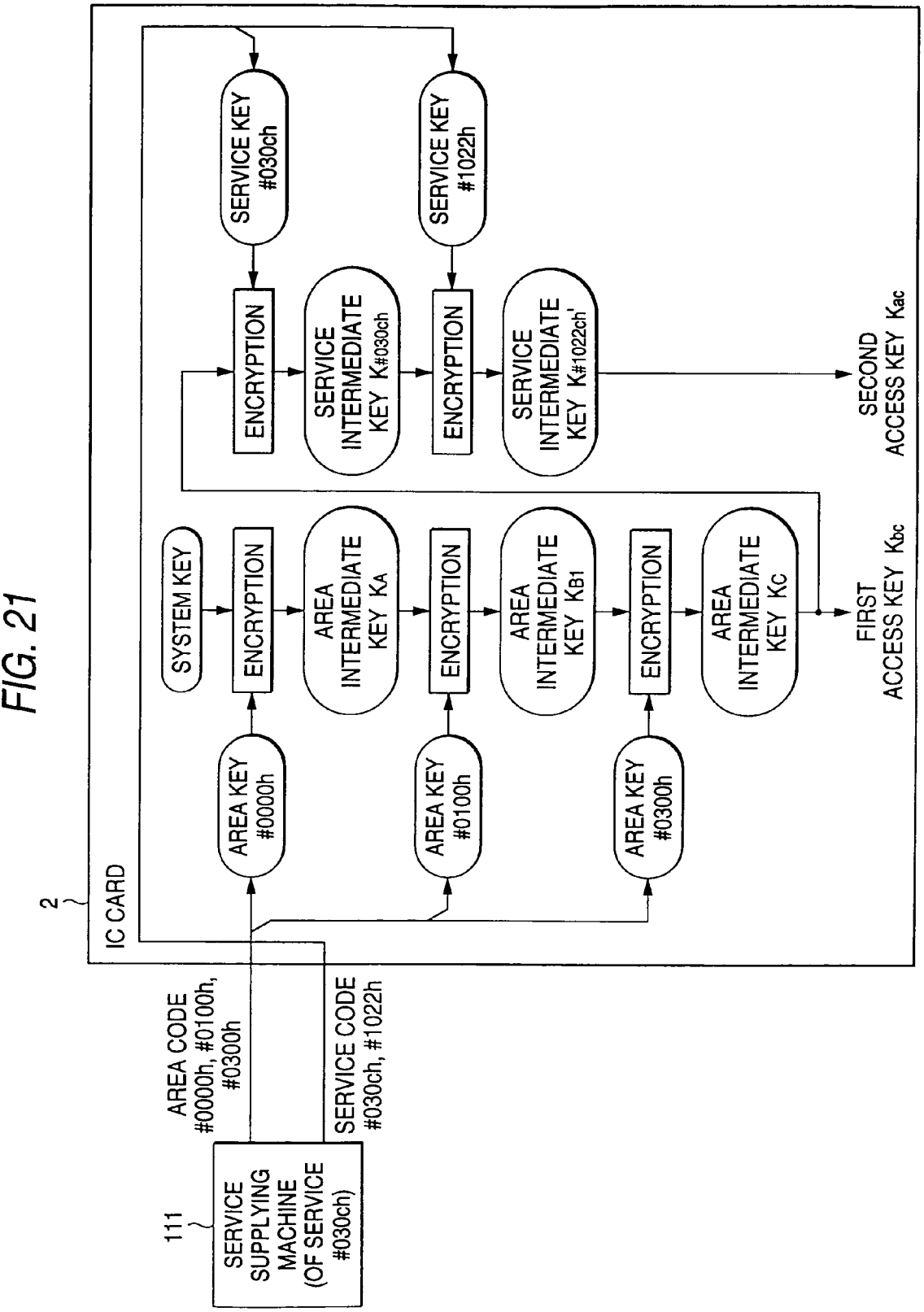
FIG. 21 is a diagram showing the processing of the IC card 2 when the manager C supplies services.

That is, as shown in FIG. 21, the service supply machine 111 transmits to the IC card 2 the registered area codes #0000h, #0100h and #0300h and the service codes #030Ch and #1022h. In the IC card 2 (sequencer 91), the area codes #0000h, #0100h and #0300h and the service codes #030Ch and #1022h are received from the service supply machine 111.

In the IC card 2, the system key stored in the system defining block (FIG. 6) is read out, and the area key #0000h, #0100h or #0300h is read out from the area defining area having the area code #0000h, #0100h or #0300h which is received from the service supply device 111, and the same key as the area intermediate key $K_C$ registered in the service supply machine 111 of FIG. 20 is generated as in the case of FIG. 19. The same key as the area intermediate key $K_C$ is set as a first access key $K_{bc}$ used for certification.

In the IC card 2, the service key #030Ch or #1022h is read out from the service defining area having the service code #030Ch or #1022h respectively which is received from the service supply machine 111. The area intermediate key $K_c$ in encrypted on the basis of the service key #030ch and as a result the same key as the service intermediate key $K_{\#030Ch}$ is generated. Further, the same key as the service intermediate key $K_{\#030Ch}$ is encrypted on the basis of the service key #1022h, and the same key as the service intermediate key $K_{\#10225}$, registered in the service supply machine 111 of FIG. 20 is generated. The same key as the service intermediate key $K_{\#1022h}$, is set as a second access key $K_{ac}$ used for certification.

Accordingly, in the above case, the area intermediate key $K_c$ or the service intermediate key $K_{\#1022h}$, which is the first access key $K_{bc}$ or the second access key $K_{ac}$ is registered in the service supply machine 111, and the area intermediate key $K_c$ or the service intermediate key $K_{\#1022h}$, which is the first access key $K_{bc}$ or the second access key $K_{ac}$ is generated in the IC card 2.

The mutual certification is carried out between the IC card 2 and the service supply machine 111 as in the case of FIGS. 14 and 15.

As a result of the mutual certification, if both the IC card 2 and the service supply machine 11 are judged to be proper, an access to only the service area managed by the service defining area having the service code transmitted from the service supply machine 111 is permitted in the IC card 2. Accordingly, in the case of FIGS. 20 and 21, the access to the service area managed by the service defining area #030Ch and the service area managed by the service defining area #1022Ch is permitted.

As described above, by encrypting the system key on the basis of the two or more area keys or service keys, the two or more area keys or service keys are degenerated (composed) into the two keys of the first access key $K_{bc}$ and the second access key $K_{ac}$, and the mutual certification to permit the access to the service area managed by the service defining area having the service code transmitted from the service supply machine 111 is performed by using the first access key $K_{bc}$ and the second access key $K_{ac}$. Therefore, even when the access to plural service defining areas is targeted, the mutual certification can be completed in a short time, thereby ensuring the quick access to the service area.

In the case of FIGS. 14 and 15, the mutual certification processing is performed by using the two keys of the first access key $K_{bc}$ and the second access key $K_{ac}$, however, it is possible to perform the mutual certification processing by using only the second access key $K_{ac}$, for example. In this case, in the IC card 2 the two or more area keys or service keys are degenerated into one second access key $K_{ac}$ by encrypting the system key on the basis of two or more area keys or service keys.

Figure 22:
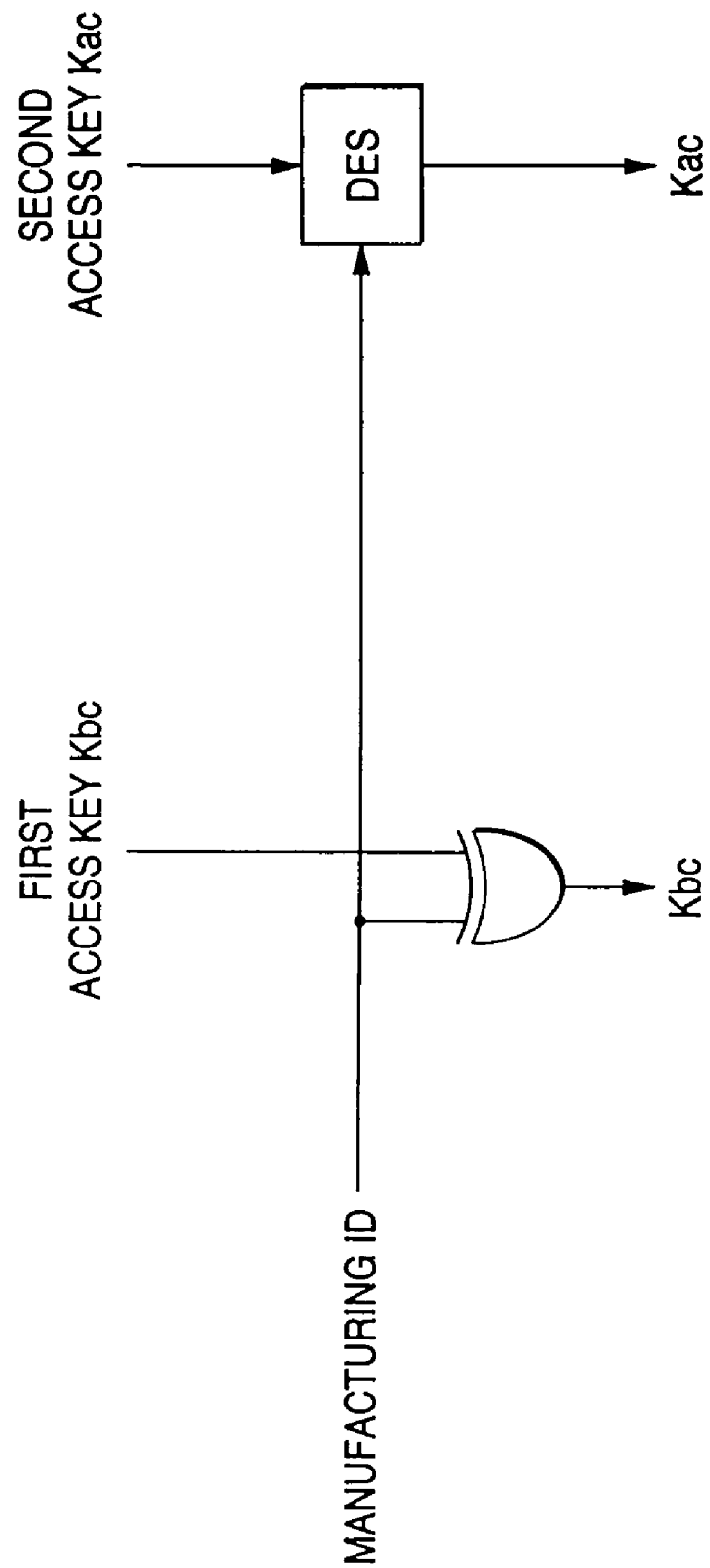
FIG. 22 is a diagram showing a method of generating a first access key and a second access key used for mutual certification.

Further, as shown in FIG. 22, it is possible to use an encryption result obtained by encrypting the first access key $K_{bc}$ and the second access key $K_{ac}$, for example, on the basis of a manufacturing ID which is stored in the manufacturing ID block and is an inherent value to the IC card 2. Here, in FIG. 22, with respect to the first access key $K_{bc}$, the encryption is carried out by subjecting the first access key $K_{bc}$ and the manufacturing ID to EXOR. With respect to the second access key $K_{ac}$, the encryption based on DES system is performed. With respect to the second access key $K_{ac}$, the encryption based on the DES system may be performed by using the EXOR result of the first access key $K_{bc}$ and the manufacturing ID as a key.

As described above, when the encryption result obtained by encrypting the first access key $K_{bc}$ and the second access key $K_{ac}$ is used for the mutual certification, the security can be more enhanced. In this case, the manufacturing ID is needed in the service supply machine 111, and it may be transmitted from the IC card 2.

Next, the storage area of EEPROM 66 has a layered structure in which the area defining are is layered, and each area defining area and each service defining area are designed to store an area key and a service key for certification. As a result, the following access control having flexibility can be performed.

That is, when a manager serves as a parent manager and wishes to stop a service supply by a child manager to which a resource of the parent manager is shared because the child manager makes an unjust service, the parent manager can prohibit the child manager from accessing the IC card 2 by altering the area key stored in the area defining area.

Specifically, for example when the manager B1 stops the service supply of the manager C in FIG. 7, the manager B1 alters the area key #0100h stored in the area defining area #0100h of the IC card 2. In this case, the area intermediate key $K_{B1}$ formed in the IC card 2, and further the area intermediate key $K_C$ are also altered in FIG. 19, so that the manager C which knows only the area intermediate key $K_C$ before the alteration cannot access the service defining area #030Ch.

The manager A which is the parent manager of the manager B1 serving as the parent manager of the manager C may alter the area key #0000h stored in the area defining area #0000h to prohibit the access to the service defining area #030Ch. However, in this case, the manager B2 which is a child of the manager A cannot access the service area managed by the service defining area #1022h of the manager B2. That is, when a manager alters the area key thereof, it is impossible to access service defining areas managed by area defining areas in layers (child layer, grandchild layer, . . . ) of the area defining area corresponding to the area key.

In FIGS. 20 and 21, the manager C uses (the service area managed by) the service defining area #1022h of the manager B2 commonly to the manager B2. However, more complicated common use of the service defining area is possible between managers for some types of key management.

Figure 23:
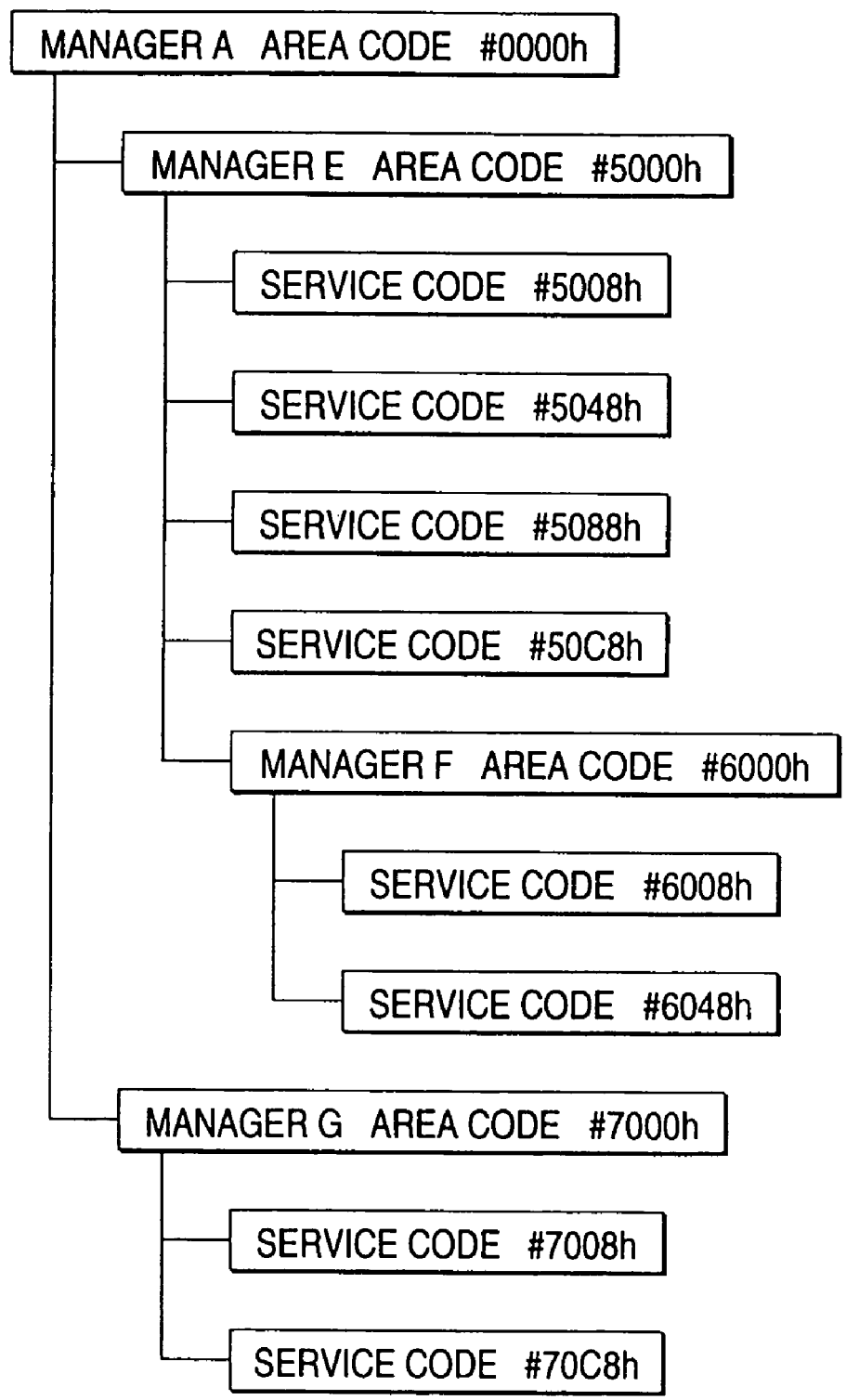
FIG. 23 is a diagram showing the layer structure of EEPROM 66.

Specifically, for example, it is assumed that a layer structure shown in FIG. 23 is constructed in EEPROM 66. That is, in FIG. 23, an area defining area #5000h of a manager E and an area defining area #7000h of a manager G are formed as child layers of the layer of the area defining area #0000h of the manager A serving as an issuer of the IC card 2. Further, service defining areas #5008h, #5048h, #5088h and #50C8h are formed in the layer of the area defining area #5000h of the manager E, and an area defining area #6000h of a manager F is formed.

Further, service defining areas #6008h and #6048h are formed in the layer of the area defining area #6000h of the manager F, and service defining areas #7008h and #70C8h are formed in the layer of the area defining area #7000h of the manager G.

Figure 24:
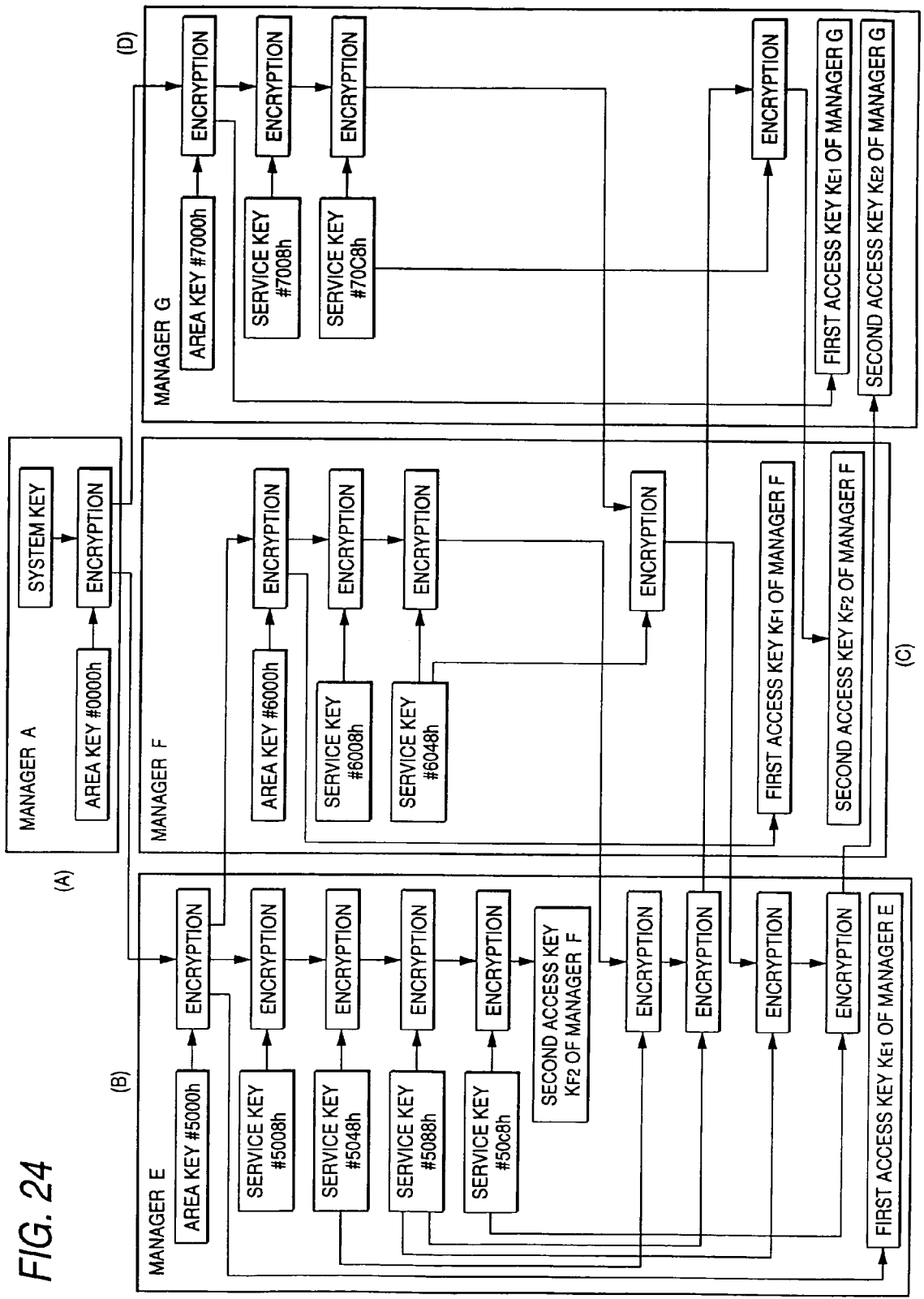
FIG. 24 is a diagram showing key reception/delivery between managers.

In the above-mentioned layer structure, the manager A encrypts the system key on the basis of the area key #0000h as shown in (A) of FIG. 24, and delivers the encryption result to the managers E and G serving as the child managers.

As shown in (B) of FIG. 24, the manager E encrypts, on the basis of the area key #5000h, the encryption result of the system key on the basis of the area key #0000h from the manager A, and uses the encryption result as a first access key $K_{E1}$. Further, the manager E encrypts the first access key $K_{E1}$ (the encryption result based on the area key #5000h) successively on the basis of each of the service keys #5008h, #5048h, #5088h and #50C8h, and uses the final encryption result as a second access key $K_{E2}$.

As shown in (C) FIG. 24, the manager F is supplied with the first access key $K_{E1}$ (the encryption result based on the area key #5000h) from the manager E, encrypts it on the basis of the area key #6000h, and sets the encryption result as a first access key $K_{F1}$. Further, the manager F encrypts the first access key $K_{F1}$ (the encryption result based on the area key #6000h) successively on the basis of each of the service keys #6008h and #6048h, and delivers the encryption result to the manager E to encrypt it successively on the basis of each of the service keys #5048h and #5088h. Thereafter, the manager F is supplied with the encryption result from the manager E and delivers it to the manager G to encrypt it on the basis of the service key #70C8h. The manager F is supplied with the encryption result from the manager G, and uses it as a second access key $K_{F2}$.

As show in (D) of FIG. 24, the manager G encrypts the encryption result of the system key based on the area key #0000h from the manager A on the basis of the area key #7000h, and uses the encryption result as a first access key $K_{G1}$. Further, the manager G encrypts the first access key $K_{G1}$ (the encryption result based on the are key #7000h) successively on the basis of each of the service keys #7008h and #70C8h, and delivers the final encryption result to the manager F to encrypt it on the basis of the service key #6048h. Thereafter, the manager G delivers to the manager E the encryption result using the service key #6048 by the manager F to encrypt the encryption result successively on the basis of each of the service keys #5088h and #50C8h. The manager G is supplied with the encryption result from the manager E and uses it as a second access key $K_{G2}$.

Figure 25:
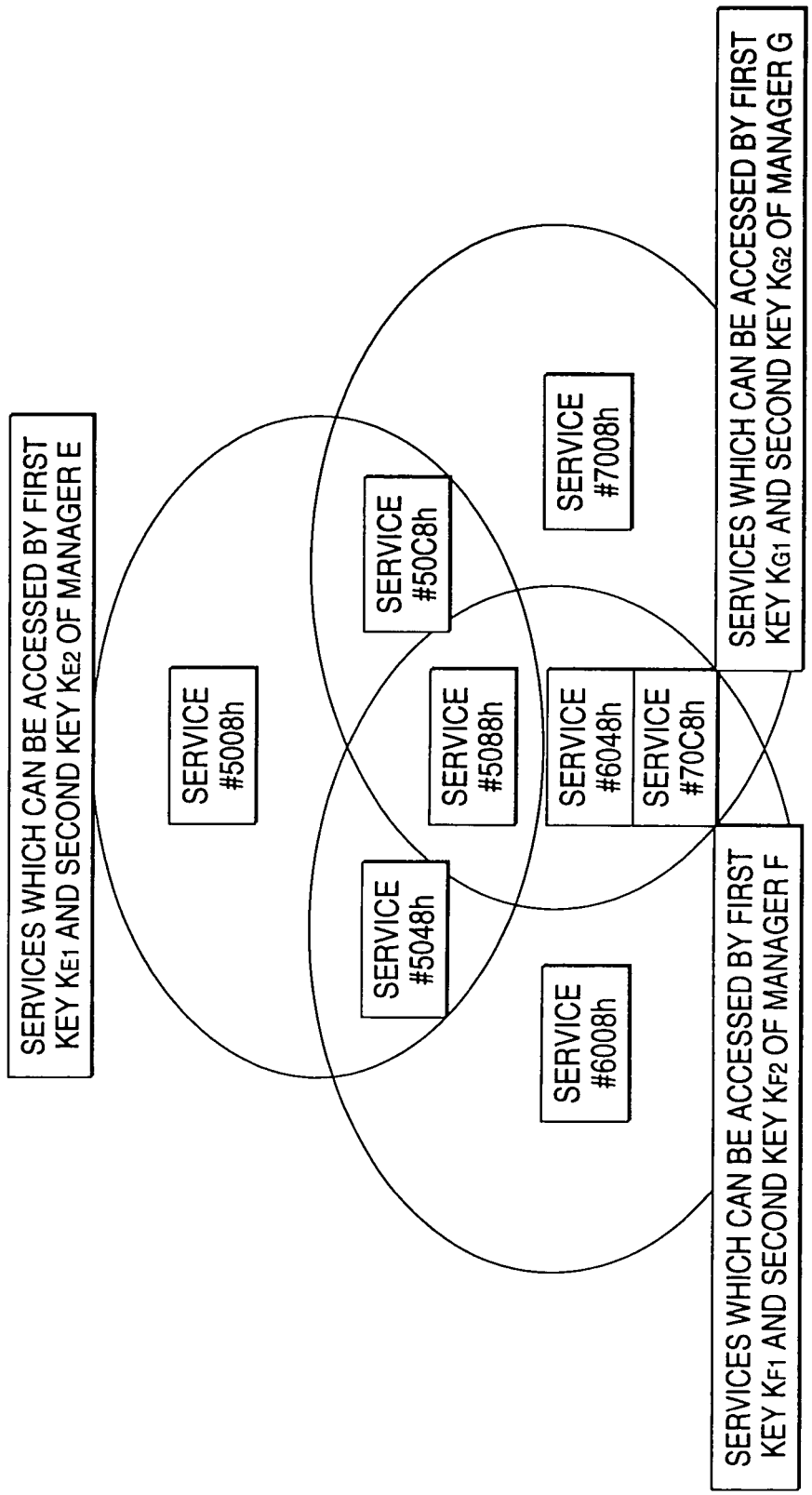
FIG. 25 is a diagram showing common use of services (data) between managers.

In this case, in the IC card 2, the system key is encrypted by using the area key and the service key stored in EEPROM 66 according to the same procedure as the case of FIG. 24 to generate the first access key and the second access key, whereby the common use of the service defining area as shown in FIG. 25 can be mutually performed among the managers E, F and G.

That is, the manager E can access only the service defining areas #5008, #5048h, #5088h and #50C8h thereof. The manager F can access not only the service defining areas #6008h and #6048h thereof, but also the service defining areas #5048h and #5088h of the manager E and the service defining area #70C8h of the manager G. The manager G can access not only the service defining areas #7008h and #70C8h thereof, but also the service defining areas #5088h and #50C8h of the manager E and the service defining area #6048h of the manager F.

In the key delivery as shown in FIG. 24, there is no case where the service key itself of a manager is known by another manager. That is, the service keys #50008h, #5048h, #5088h and, #50C8h of the manager E are never known not only by the parent manager A, but also by the managers F and G. Likewise, the service keys #6008h and #6048h of the manager F are never known by the managers E and G, and the service keys #7008h and #70C8h of the manager G are never known by the managers E and F.

Further, as described above, when some manager alters its area key, it is impossible to access to all the service defining areas managed by the area defining area of the layer in the layer of the area defining area, that is, when the parent manager alters the area key, the child managers cannot access the IC card 2. However, in accordance with a specific key management method, an access of a specific child manager can be prohibited.

Figure 26:
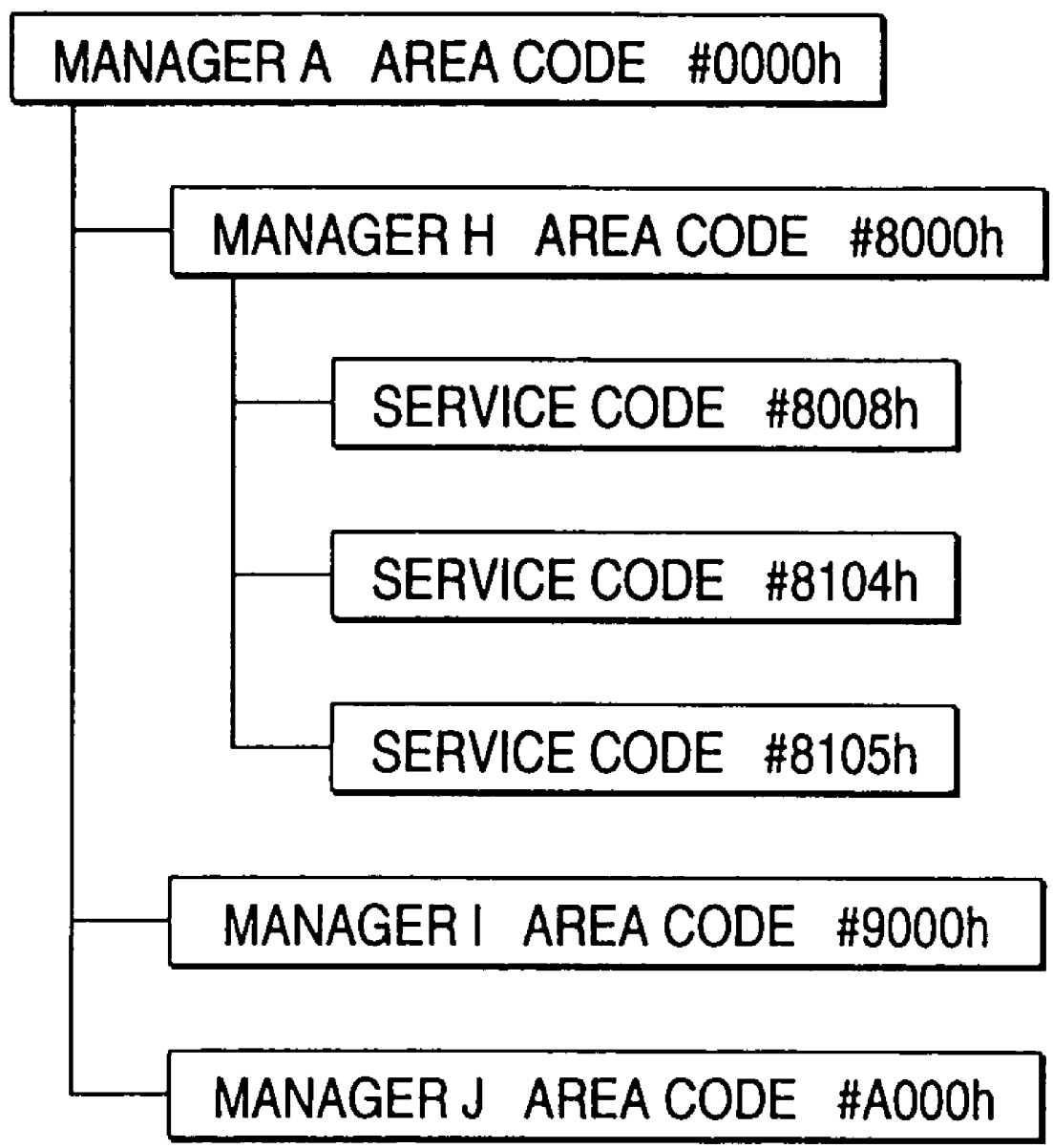
FIG. 26 is a diagram showing the layer structure of EEPROM 66.

Specifically, for example, it is assumed that a layer structure as shown in FIG. 26 is constructed in EEPROM 66. That is, in FIG. 26, an area defining area #8000h of a manager H, an area defining area #9000h of a manager I and an area defining area #A000h of a manager J are formed as child layers of the layer of the area defining area #0000h of the manager A serving as the issuer of the IC card 2. Further, service defining areas #8008h, #8104h and #8105h are formed in the layer of the area defining area #8000h of the manager H.

Figure 27:
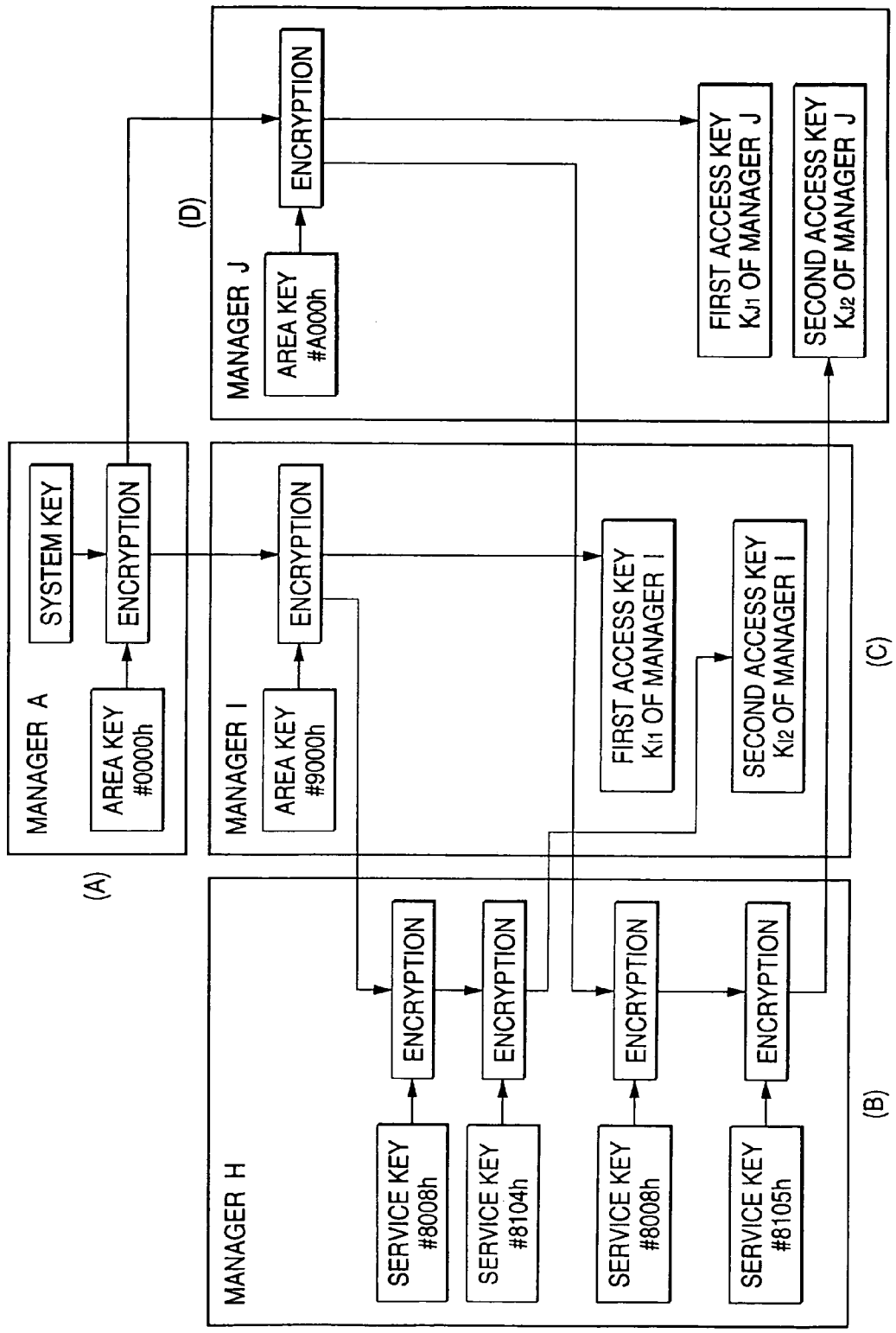
FIG. 27 is a diagram showing key reception/delivery between managers.

In the above layer structure, as shown in (A) of FIG. 27, the manager A encrypts the system key on the basis of the area key #0000h and delivers the encryption result to the managers I and J serving as child managers thereof.

As shown in (C) of FIG. 27, the manager I encrypts the encryption result of the system key based on the area key #0000h from the manager A on the basis of the area key #9000h, and use the encryption result as a first access key $K_{I1}$. Further, the manager I delivers the first access key $K_{I1}$, (the encryption result based on the area key #9000h) to the manager H to encrypt it successively on the basis of each of the service keys #8008h and #8104h as shown in (B) of FIG. 27. Then, the manager I uses the encryption result as a second access key $K_{I2}$ as shown in (C) of FIG. 27.

As shown in (D) of FIG. 27, the manager J encrypts the encryption result of the system key based on the area key #0000h from the manager A on the basis of the area key #A000h, and uses the encryption result as a first access key $K_{J1}$. Further, the manager J delivers the first access key $K_{J1}$ (the encryption result based on the area key #A000h) to the manager H to encrypt the encryption result successively on the basis of each of the service keys #8008h and #8105h as shown in (B) of FIG. 27. The manager J uses the encryption result as a second access key $K_{J2}$ as shown in (D) of FIG. 27.

In this case, in the IC card 2, the system key is encrypted by using the area key and the service key stored in EEPROM 66 according to the same procedure as the case of FIG. 27 to generate the first access key and the second access key, whereby the manager I can access the service defining areas #8008h and #8104h of the manager H and the manager J can access the service defining areas #8008h and #8105h of the manager H.

The manager H forms the service defining area #8008h so as to commonly use the data thereof between the managers I and J, and forms the service defining area #8104h or #8105h as a so-called dummy service defining area to control the access to the service defining area #8008h by each of the manager I or J. Accordingly, the service areas managed by the service defining areas #8104h and #8105H are not necessary, and the capacity thereof may be equal to zero.

In this case, for example when the manager H alters the service key #8104h, the manager I in which the second access key $K_{I2}$ is generated by using the service key #8104h to perform the certification processing in the IC card 2 cannot access the service defining area #8008h. That is, only the access to the service defining area #8008h by the manager I is prohibited. On the other hand, for example when the manager H alters the service key #8105h, the manager J in which the second access key $K_{J2}$ is generated by using the service key #8105h to perform the certification processing in the IC card 2 cannot access the service defining area #8008h. That is, only the access to the service defining area #8008h by the manager J is prohibited.

As described above, a specific child manager can be prohibited from accessing by using a dummy service defining area.

Figure 8:
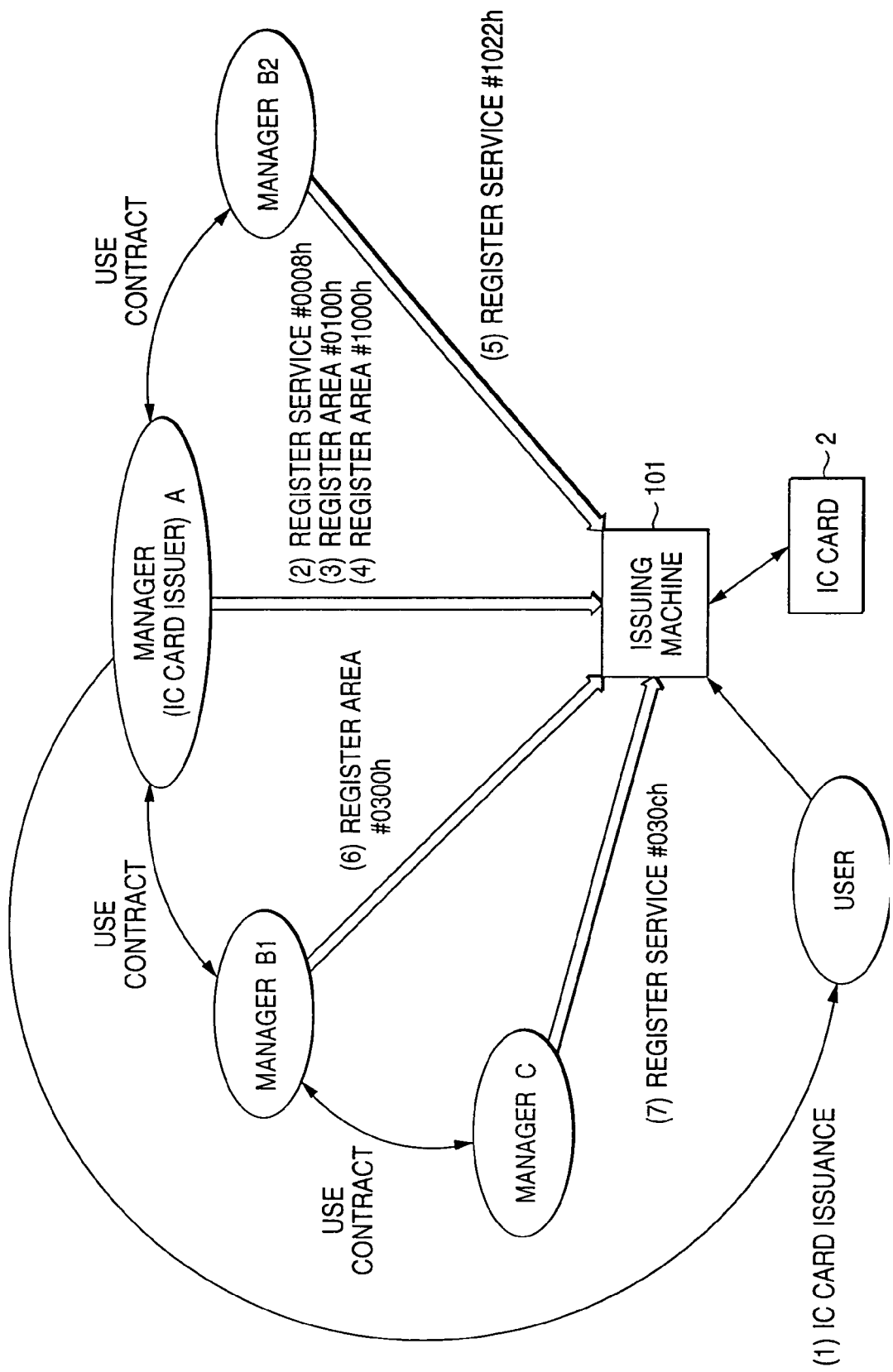
FIG. 8 is a diagram showing a process of constructing the layer structure of FIG. 7.

Next, when the registered card issuing machine 101 is disposed at a station, a retail store or other non-safe places in the case where management information (hereinafter referred to as registered card issuing information) to manage user blocks such as the code range, the allocation block number, the area key, the service key, etc. which are needed for the manager to form the area defining area and the service defining area as described with reference to FIG. 8 is registered in the registered card issuing machine 101 and the registered card issuing work is carried out, the probability that an unfair practice such as tapping, tampering or the like is carried out is high, and thus it is unfavorable in security management.

Figure 28:
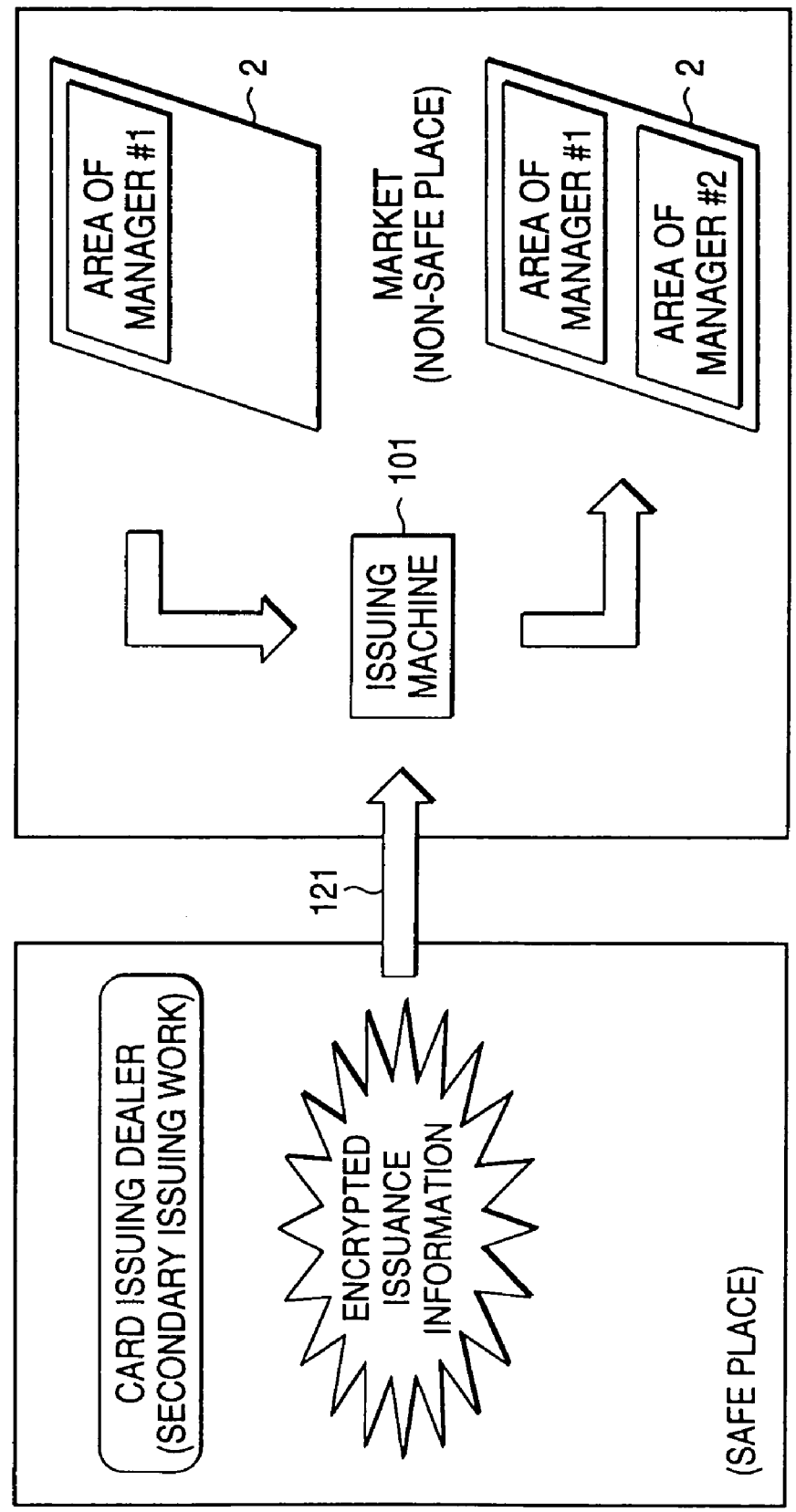
FIG. 28 is a diagram showing the principle of the present invention.

Therefore, in this case, as shown in FIG. 28, a manager which will form an area defining area and a service defining area (hereinafter referred to as a registered card issuing dealer) encrypts the registered card issuing information and transmits the encrypted registered card issuing information to the registered card issuing machine 101 through a transmission medium 121 such as a public line, Internet, ground wave, a satellite line, a CATV (Cable Television) network or the like to register the information into the registered card issuing machine 101. In the registered card issuing machine 101, the encrypted registered card issuing information is transmitted to the IC card 2, and in the IC card 2 the encrypted registered card issuing information is decoded to form the area defining area and the service defining area.

Here, FIG. 28 shows a state where a storage area to supply services by a manager #2 is constructed as described above on an IC card 2 in which only a storage area to supply services by a manager #1 is constructed (a state where the registered card issuing work is carried out).

Figure 29:
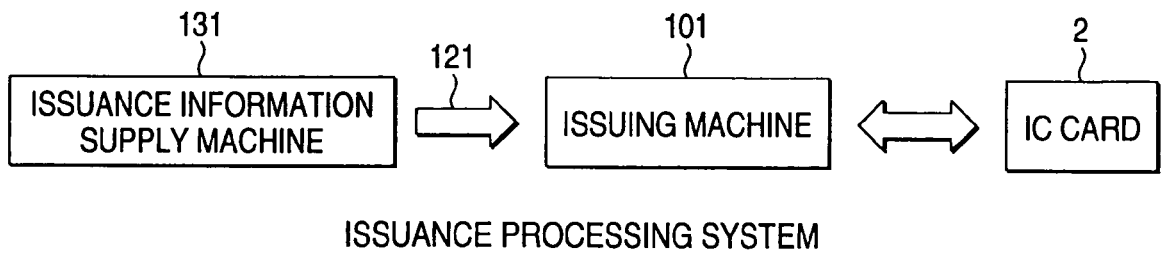
FIG. 29 is a block diagram showing the construction of an embodiment of a registered card issuing system to which the present invention is applied.

Next, FIG. 29 shows the construction of an embodiment of a registered card issuing processing system for performing the above registered card issuing work.

A registered card issuing information supply apparatus 131 transmits registered card issuing information (hereinafter referred to as encrypted registered card issuing information) through a transmission medium 121 to the registered card issuing machine 101 by performing the registered card issuing information supply processing described later. The registered card issuing machine 101 receives and registers the encrypted registered card issuing information from the registered card issuing information supply apparatus 131. When the IC card 2 is inserted into the registered card issuing machine 101, the registered car issuing machine 101 transmits the encrypted registered card issuing information to the IC card 2. The IC card 2 receives the encrypted registered card issuing information from the registered card issuing machine 101 and performs the decoding processing described later to decode the encrypted registered card issuing information to the original registered card issuing information. Thereafter, the IC card 2 performs the above area forming processing (FIG. 9) or service forming processing (FIG. 10) to form the area defining area or the service defining area on the basis of the decoded registered card issuing information.

Next, the registered card issuing information supply processing carried out by the registered card issuing information supply apparatus 131 will be described with reference to the flowchart of FIG. 30.

The registered card issuing information supply apparatus 131 is supplied with a code range, an allocation block number and an area key needed to form an area defining area or a service code, an allocation block number and a service key needed to form a service defining area. In step S21, the registered card issuing information is formed on the basis of these input information.

That is, when the code range, the allocation number and the area key needed to form the area defining area are input, these data are associated with each other to form the registered card issuing information. When the service code, the allocation number and the service key needed to form the service defining area are input, these data are associated with each other to form the registered card issuing information.

The processing goes to step S22 to operate an error correction code for the registered card issuing information formed in step S21, and the operation result is contained as a check code for checking tampering in the registered card issuing information.

Thereafter, the registered card issuing information is encrypted in step S23. That is, in step S23, the registered card issuing information is encrypted on the basis of the area key of the area defining area of the parent layer of an area defining area or service defining area to be formed on the basis of the registered card issuing information, and it is set as encrypted registered card issuing information.

Thereafter, the processing goes to step S24 to add an identification code (when the encrypted registered card issuing information is used to form an area defining area, the identification code is the area code of the area defining area concerned, and when it is used to form a service defining area, the identification code is the service code thereof) as a header to the encrypted registered card issuing information, and the identification code is transmitted through the transmission medium 121 to the registered card issuing machine 101, thereafter completing the registered card issuing information supply processing.

Figure 31:
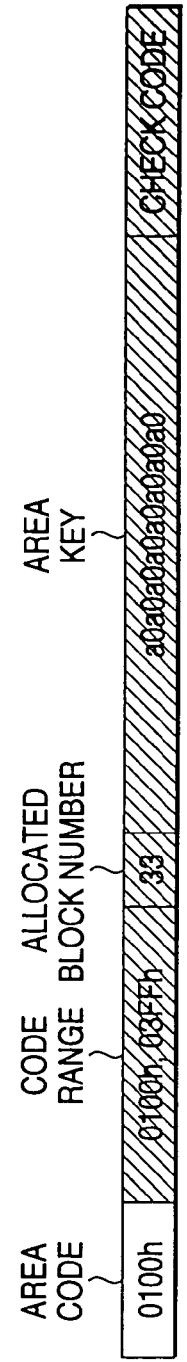
FIG. 31 is a diagram showing the format of encrypted registered card issuing information.
Figure 31:
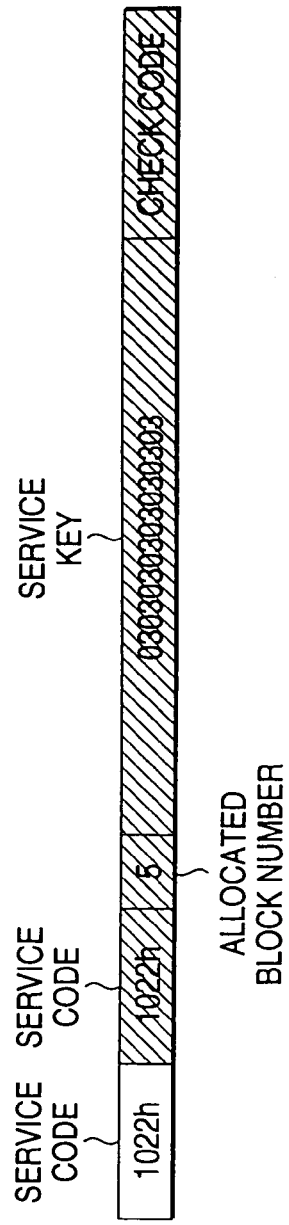

Accordingly, for example when the parent manager A forms the area defining area #0100h of the child manager B1 in FIG. 7, the encrypted registered card issuing information as shown in (A) of FIG. 31 is transmitted from the registered card issuing information supply apparatus 131. That is, the area code #0100h of the area defining area #0100h is disposed as a header at the head of the encrypted registered card issuing information of (A) of FIG. 31. The area code #0100h is not encrypted in the IC card 2 because it is used to recognize the parent layer. Further, the area code #0100h is recognized on the basis of the code range of the input information in the registered card issuing information supply apparatus 131. This is because according to this embodiment the minimum value of the code range of the area defining area is set as an area code and thus the area code can be recognized on the basis of the code range as described above.

A code range from #0100h to #03FFh to be stored in the area defining area #0100h, an allocation block number 33, a0a0a0a0a0a0a0a0 as the area key #0100h and a check code are successively disposed subsequently to the non-encrypted area code #0100h as a header. These are encrypted (illustrated as being shadowed in FIG. 31(A)) on the basis of 0123456789abcdef as the area key #0000h of the area defining area #0000h serving as the parent layer.

When the manager B2 forms the service defining area #1022h thereof in FIG. 7, the encrypted registered card issuing information as shown in (B) of FIG. 31 is transmitted from the registered card issuing information supply apparatus 131. That is, the service code #1022h of the service defining area #1022h is disposed as a header at the head of the encrypted registered card issuing information of (B) of FIG. 31. The service code #1022h is not encrypted in the IC card 2 because it is used to recognize the parent layer (the layer to which the service defining area belongs).

The service code #1022h to be stored in the service defining area #1022h, an allocation block number 5, 0303030303030303 as the area key #1022h and a check code are successively disposed subsequently to the non-encrypted service code #1022h as a header. These are encrypted (illustrated as being shadowed in (B) of FIG. 31) on the basis of c0c0c0c0c0c0c0c0 as the area key #1000h of the area defining area #1000h serving as the parent layer.

Since the registered card issuing information is encrypted on the basis of the area key of the parent layer as described above, the content of the registered card issuing information cannot be known insofar as the area key thereof is known. Accordingly, even when the encrypted registered card issuing information as described above is transmitted to a non-safe place, leakage of the content thereof can be prevented. As a result, it is possible to distribute the encrypted registered card issuing information and request the third party to register it into the registered card issuing machine 101 or transmit it to the IC card 2.

In this case, the registered card issuing information is encrypted on the basis of the area key of the parent layer, and thus it is basically favorable that the registered card issuing information supply processing is performed under the control of its parent manager. That is, when the registered card issuing information supply processing is carried out by a third party, the area key of the parent layer used for the encryption must be made publicly open to the third party, and this is unfavorable in security. Therefore, the registered card issuing information supply processing is favorably performed under the control of the parent manager.

Next, the decoding processing carried out by the IC card 2 will be described with reference to the flowchart of FIG. 32.

When the encrypted registered card issuing information is transmitted from the registered card issuing information supply apparatus 131 as described above, the registered card issuing machine 101 receives and registers the encrypted registered card issuing information. When the IC card 2 is inserted, the registered card issuing machine 101 transmits the encrypted registered card issuing information to the IC card 2. The IC card 2 receives the encrypted registered card issuing information from the registered card issuing machine 101 to recognize the area defining area as the parent layer of an area defining area or service defining area to be formed on the basis of the encrypted registered card issuing information in step S31.

That is, in step S31, the area code or service code of the area defining area or service defining area to be formed is recognized by referring to the header of the encrypted registered card issuing information. In step S31, the area defining area containing the area code or service code thus recognized in the code range is detected from EEPROM 66, and the area defining area is recognized as the parent layer.

The processing goes to step S32 to decode the encrypted registered card issuing information on the basis of the area key stored in the area defining area of the parent layer recognized in step S31, and then the processing goes to step S33. In step S33, it is judged on the basis of the check code contained in the decoded registered card issuing information whether the registered card issuing information has been tampered. If in step S33 it is judged that the registered card issuing information has been tampered, the processing goes to step S34 to transmit to the registered card issuing machine 101 a message indicating that the registered card issuing information has been tampered, and perform error processing of discarding the decoded registered card issuing information or the like, thereby completing the decoding processing. In this case, the decoding processing is abnormally finished, and the area defining area or the service defining area is not formed.

On the other hand, if it is judged in step S33 that the registered card issuing information has not been tampered, the decoding processing is finished. In this case, the decoding processing is normally finished, and then the processing of storing the registered card issuing information thus decoded into EEPROM 66, that is, the area forming processing (FIG. 9) of forming the area defining area or service defining area or the service forming processing (FIG. 10) is carried out.

The chick as to the tampering of the registered card issuing information may be carried out by using the header of the encrypted registered card issuing information in place of the check code. That is, if the encrypted registered card issuing information is used to form the area defining area, the area code is disposed at the header thereof as shown in FIG. 31(A), and the area code may be coincident with the minimum value of the encrypted code range disposed subsequent to the area code. Accordingly, the tampering or non-tampering of the encrypted registered card issuing information can be checked by comparing the area code disposed at the header with the minimum value of the code range disposed subsequent to the area code. Further, if the encrypted registered card issuing information is used to form the service defining area, as shown in FIG. 31(B), the service code is disposed at the header, and the service code may be coincident with the encrypted service code disposed subsequently to the service code. Accordingly, the tampering or non-tampering of the encrypted registered card issuing information can be checked by comparing the service code disposed at the header with the service code disposed subsequently to the service code.

As described above, in the registered card issuing information supply apparatus 131, the registered card issuing information is encrypted to obtain the encrypted registered card issuing information, and the encrypted registered card issuing information is decoded in the IC card 2. Therefore, even when the registered card issuing machine 101 is disposed at a non-safe place to transmit through the transmission medium 121, an unfair practice such as tapping, tampering or the like can be prevented.

As a result, when a registered card issuing work is carried out to start supply of a new service by using the IC card 2, it is unnecessary to withdraw the IC card 2, and thus the cost needed to the withdrawal can be reduced. Further, from a position of a user of the IC card 2, when the supply of a new service is started, the user may bring the IC card 2 to a place at which the registered card issuing machine 101 is set and perform the registered card issuing work without being withdrawn the IC card 2, whereby the user can be immediately supplied with the new service.

In the foregoing description, the present invention is applied to a non-contact card system in which the communication is performed under a contactless state. However, the present invention may be applied to a card system in which the communication is performed under a contact state. Further, the application range of the present invention is not limited to the card system.

In this embodiment, the certification is carried out by a so-called secrete key system, however, it may be performed by a so-called open-public key system.

In this embodiment, when the service defining area of the layer of an area defining area is accessed, the first access key is generated by successively using the area keys of the area defining areas on the bus from the layer of the area defining area to the uppermost layer, however, the generation method of the first access key is not limited to the above manner. Further, according to this embodiment, the second access key is generated by successively using the service keys of the service defining area to be accessed. However, the generation method of the second access key is not limited to the above manner. That is, the first access key and the second access key can be generated by successively using any two or more area keys or service keys.

Further, in this embodiment, each of the user block and the system block is stored in EEPROM 66 which is one memory. However, the user block and the system block may be stored in physically different memories.

In this embodiment, data are stored in EEPROM, however, the data may be stored in a semiconductor memory, a magnetic disc or the like other than EEPROM.

In this embodiment, the registered card issuing information is encrypted on the basis of the area key in the area defining area of the parent layer in the registered card issuing information supply processing. However, the key used for the encryption of the registered card issuing information is not limited to the area key of the parent layer. However, since it is necessary to decode the encrypted registered card issuing information, the key used for the encryption of the registered card issuing information must be stored in the IC card 2. Accordingly, when the area key of the parent layer is used to encrypt the registered card issuing information, the area key of the parent layer has been already stored in the IC card 2, and thus a key used to decode (encrypt) the registered card issuing information is not required to be stored in the IC card 2 in addition to the key of the parent layer.

Further, in this embodiment, the storage area of EEPROM 66 is managed while it is designed in the layer structure. However, the present invention may be applied to a case where the storage area of EEPROM 66 is not managed in the layer structure.

Still further, in this embodiment, the encrypted registered card issuing information is transmitted through the transmission medium 121 to the registered card issuing machine 101 to be registered into the registered card issuing machine 101. However, the encrypted registered card issuing information may be stored in a recording medium (storage medium) such as a magnetic disc, an magnet optical disc, an optical disc, a memory card, a magnetic tape or the like, which will be directly brought to the registered card issuing machine 101 to register the encrypted registered card issuing information.

According to the information processing device of the first aspect of the present invention and the information processing method of the second aspect of the present invention, management information which is used to manage a storage area of data storage means and contains a key necessary to access the storage area is encrypted. Accordingly, the content of the management information can be prevented from leaking to a third party.

According to the information processing device of the third aspect of the present invention and the information processing method of the fourth aspect of the present invention, management information which is used to manage a storage area of data storage means, contains a key necessary to access the storage area and is encrypted is decoded. Accordingly, the content of the management information can be prevented from leaking to a third party.

What is claimed is:

1. An information processing device for supplying management information to a data storage device, said information processing device comprising:
   forming means for forming management information that manages a storage area in the data storage device in a layered structure, said storage area divided into a plurality of system blocks and a plurality of user blocks;
   encrypting means for encrypting said management information, said encrypting means encrypting a lower layer of the management information by using a key contained in an upper layer of the management information;
   communication means for communicating the encrypted management information to said data storage device; and
   means for generating a check code to check whether the management information has been tampered with by a non-authorized user,
   wherein said encrypting means encrypts the check code together with the management information;
   wherein said plurality of user blocks are allocated in an ascending order, said plurality of system blocks are allocated in a descending order, and a boundary between the plurality of user and system blocks is variable; and
   wherein said plurality of system blocks are classified into at least three areas, a system defining block area, a defining block area, and a service defining block area.

2. The information processing device as claimed in claim 1, wherein said communication means is configured to transmit the encrypted management information through a predetermined transmission medium.

3. The information processing device as claimed in claim 1, wherein said forming means forms said management information such that the management information contains a storage area identifying code to be allocated to a storage area of the data storage device to be managed, and is used to identify said storage area.

4. The information processing device as claimed in claim 1, wherein said forming means forms said management information such that said management information contains information on the amount of empty capacity of said storage area to be managed.

5. A data storage device comprising:
   receiving means for receiving encrypted management information from an external equipment, wherein a storage area is managed with management information in a layer structure and contains a key, said storage area divided into a plurality of system blocks and a plurality of user blocks;
   decrypting means for decrypting a lower layer of the encrypted management information by using said key, said key being contained in an upper layer of the management information;
   data storage means for storing data to supply predetermined services, wherein access to a storage area of said data storage means is provided by said key; and
   management information storage means for storing the management information;
   operation means for operating on a cheek code to check whether the management information has been tampered with by a non-authorized user,
   wherein said decrypting means decrypts the check code together with the management information;
   wherein said plurality of user blocks are allocated in an ascending order, said plurality of system blocks are allocated in a descending order, and a boundary between the plurality of user and system blocks is variable; and
   wherein said plurality of system blocks are classified into at least three areas, a system defining block area, a defining block area, and a service defining block area.

6. The data storage device as claimed in claim 5, wherein said receiving means provides access to said external equipment through a predetermined transmission medium.

7. The data storage device as claimed in claim 5, wherein said receiving means is arranged to perform the communications with said external equipment in a contact or non-contact state.

8. The data storage device as claimed in claim 5, wherein said management information contains a storage area identifying code which can be allocated to said storage area to be managed and is used to identity said storage area.

9. The data storage device as claimed in claim 5, wherein said management information contains information on the amount of an empty capacity of said storage area to be managed.

10. An information processing system comprising a data storage device and an information processing device, said information processing device comprising:
   forming means for forming management information that manages a storage area in the data storage device in a layered structure, said storage area divided into a plurality of system blocks and a plurality of user blocks;
   encrypting means for encrypting said management information, said encrypting means encrypting a lower layer of the management information by using a key contained in an upper layer of the management information; and
   communication means for communicating the encrypted management information to said data storage device,
   said data storage device comprising:
   receiving means for receiving encrypted management information from said information processing device;
   decrypting means for decrypting the lower layer of the encrypted management information by using the key contained in the upper layer of the management information;
   data storage means for storing data to supply a predetermined service, wherein access to a storage area of said data storage means is provided by said key;
   management information storage means for storing said management information; and
   code generating means for generating a check code to check whether the management information has been tampered with by a non-authorized user,
   wherein said encrypting means encrypts the check code together with the management information;
   wherein said plurality of user blocks are allocated in an ascending order, said plurality of system blocks are allocated in a descending order, and a boundary between the plurality of user and system blocks is variable; and
   wherein said plurality of system blocks are classified into at least three areas, a system defining block area, a defining block area, and a service defining block area.

11. An information processing method comprising the steps of:
   forming management information for managing a storage area in a layer structure, said storage area divided into a plurality of system blocks and a plurality of user blocks;
   encrypting the management information to provide encrypted management information, with a lower layer of said management information being encrypted by using a key contained in an upper layer of the management information;
   communicating said encrypted management information to a data storage device;
   decrypting the encrypted lower layer of the management information by using the key;
   storing data to supply predetermined services in a storage area of said data storage device, access to the storage area being provided by the key;
   storing management information in a management information storage means of said data storage device; and
   generating a check code to check whether the management information has been tampered with by a non-authorized user,
   wherein the check code is encrypted together with the management information;
   wherein said plurality of user blocks are allocated in an ascending order, said plurality of system blocks are allocated in a descending order, and a boundary between the plurality of user and system blocks is variable; and
   wherein said plurality of system blocks are classified into at least three areas, a system defining block area, a defining block area, and a service defining block area.

12. A data storage method for storing data to supply a predetermined service, said data storage method comprising the steps of:
   receiving encrypted management information from an external equipment, said management information being provided for managing a storage area in a layer structure and containing a key, said storage area divided into a plurality of system blocks and a plurality of user blocks;
   decrypting a lower layer of the encrypted management information by using the key contained in the upper layer of the management information;
   storing data to supply a predetermined service in a data storage means, with access to a storage area of said data storage means being provided by the key;
   storing management information in a management information storage means;
   forming the storage area of said data storage means in a layer structure on the basis of the management information;
   managing the storage area of said data storage means on the basis of the management information; and
   operating on a check code to check whether the management information has been tampered with by a non-authorized user,
   wherein the check code is encrypted together with the management information;
   wherein said plurality of user blocks are allocated in an ascending order, said plurality of system blocks are allocated in a descending order, and a boundary between the plurality of user and system blocks is variable; and
   wherein said plurality of system blocks are classified into at least three areas, a system defining block area, a defining block area, and a service defining block area.

* * * * *